(12) United States Patent
Hara et al.

(10) Patent No.: US 7,753,454 B2
(45) Date of Patent: Jul. 13, 2010

(54) BICYCLE WHEEL SECURING STRUCTURE

(75) Inventors: Nobukatsu Hara, Osaka (JP); Takanori Kanehisa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/486,034

(22) Filed: Jun. 17, 2009

(65) Prior Publication Data
US 2009/0256414 A1 Oct. 15, 2009

Related U.S. Application Data

(60) Division of application No. 11/738,940, filed on Apr. 23, 2007, now Pat. No. 7,556,321, which is a continuation-in-part of application No. 11/670,243, filed on Feb. 1, 2007, now Pat. No. 7,537,291.

(51) Int. Cl.
*B60B 35/00* (2006.01)

(52) U.S. Cl. .................. 301/124.2; 301/110.5

(58) Field of Classification Search ............. 301/110.5, 301/124.2; 403/374.1, 374.2, 374.3, 374.4, 403/374.5; 280/279, 288
See application file for complete search history.

(56) References Cited

U.S. PATENT DOCUMENTS 4,079,958 A 3/1978 Segawa
5,257,855 A 11/1993 Nagano
5,383,716 A 1/1995 Stewart et al.
5,823,555 A 10/1998 Ashman
6,089,675 A 7/2000 Schlanger
6,241,322 B1 6/2001 Philips
6,435,622 B1 8/2002 Kanehisa et al.
7,628,416 B2 * 12/2009 Hara .......................... 280/260
7,654,546 B2 * 2/2010 Watarai ...................... 280/279
7,654,548 B2 * 2/2010 Kanehisa et al. ............ 280/279
2005/0264097 A1 12/2005 Meggiolan
2008/0284127 A1 * 11/2008 Watarai ...................... 280/279

FOREIGN PATENT DOCUMENTS

EP 0 8910 505 B1 7/1997

* cited by examiner

*Primary Examiner*—Russell D Stormer
(74) *Attorney, Agent, or Firm*—Global IP Counselors, LLP

(57) ABSTRACT

A bicycle wheel securing structure includes an outer axle, an inner axle, a head member, a lever member, a fixing structure and an adjustment member. The outer axle has a first threaded end and a second end. The inner axle is coupled to the outer axle within an internal bore of the outer axle. The head member is disposed on the inner axle with the lever member operatively mounted to move the head member relative to the inner axle in response to movement of the lever member. The fixing structure is disposed between the outer axle and the inner axle to releasably prevent axial removal of the inner axle from the internal bore of the outer axle. The fixing structure and the adjustment member cooperate together to adjust a final position of the lever member in a rotational direction with respect to the outer axle.

11 Claims, 33 Drawing Sheets

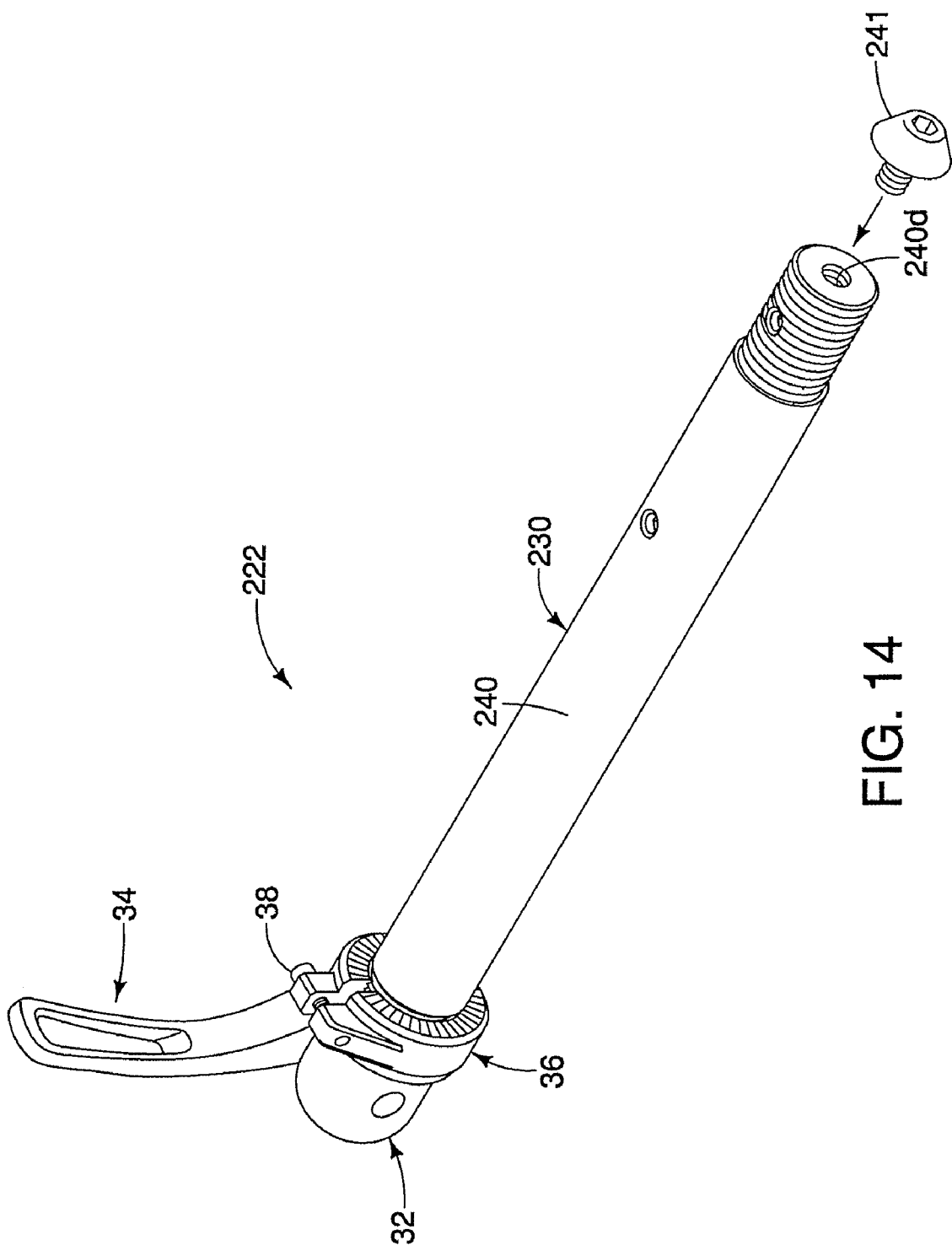

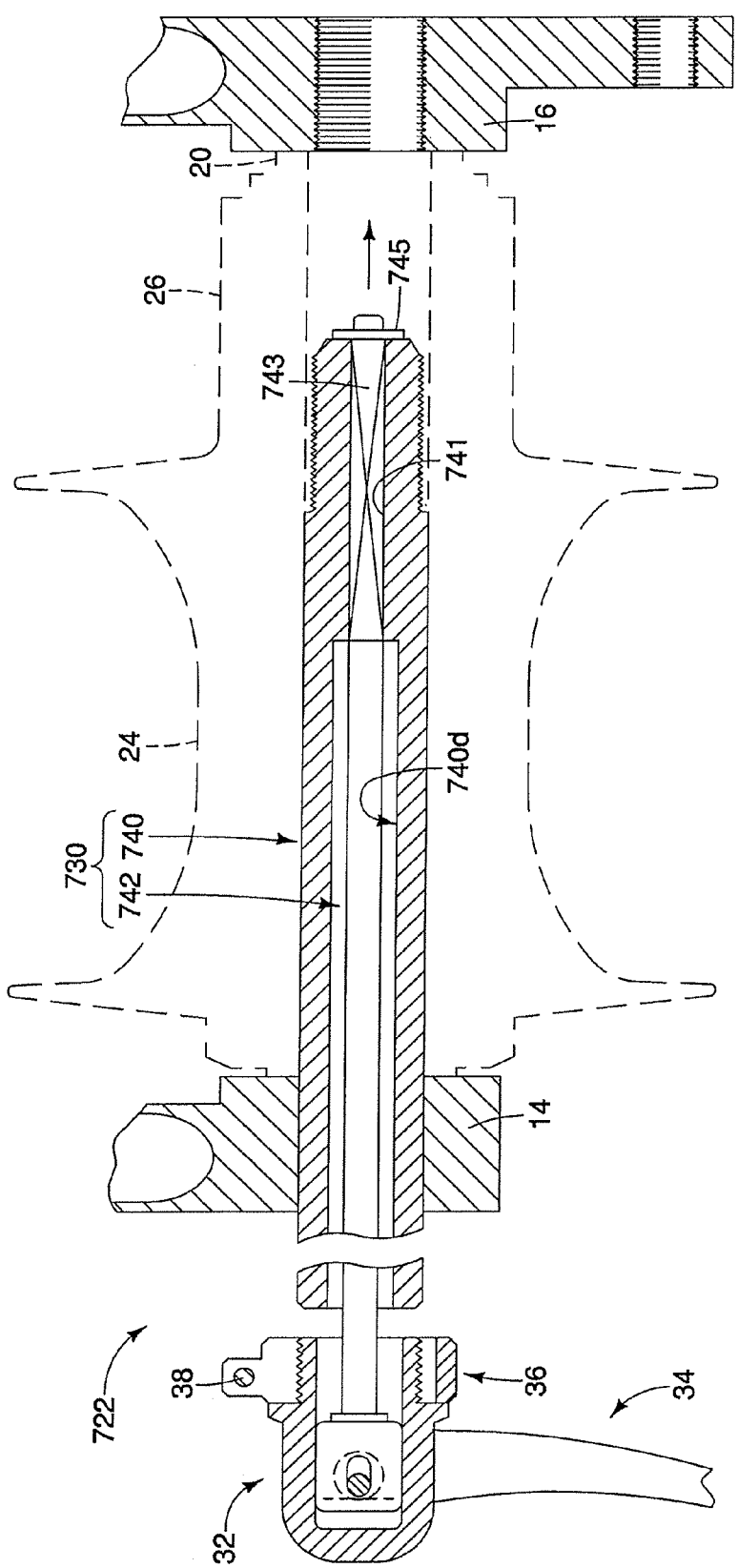
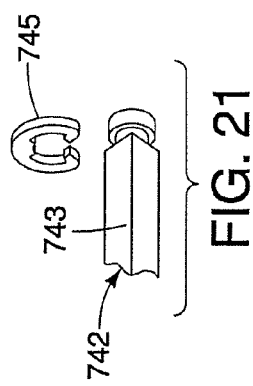
FIG. 20
FIG. 21

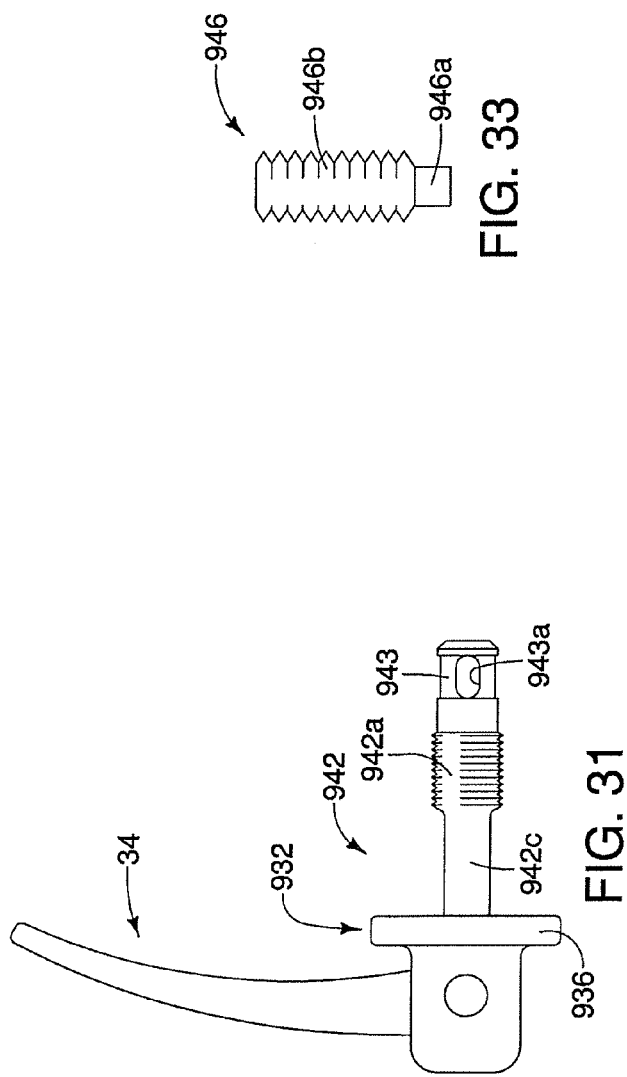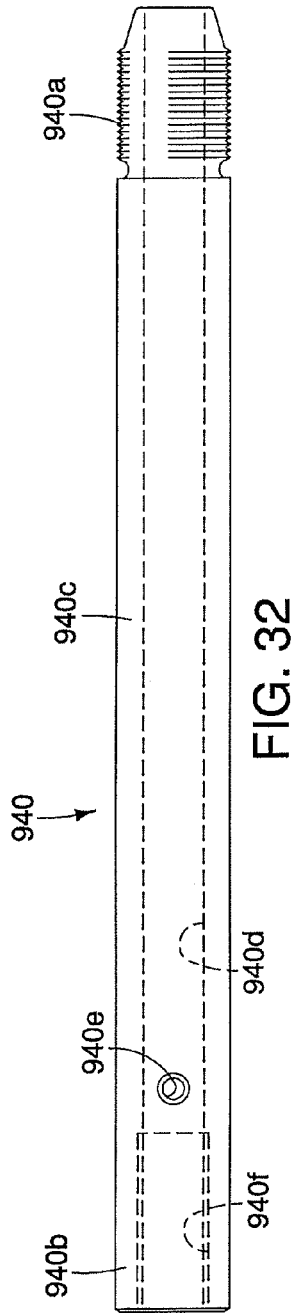

BICYCLE WHEEL SECURING STRUCTURE

CROSS-REFERENCE TO RELATED APPLICATIONS

This application is a divisional application of prior U.S. patent application Ser. No. 11/738,940 filed on Apr. 23, 2007 (now U.S. Pat. No. 7,556,321), which is a continuation-in-part application of prior U.S. patent application Ser. No. 11/670,243 filed on Feb. 1, 2007 (now U.S. Pat. No. 7,537,291). The entire disclosures of U.S. patent application Ser. Nos. 11,738,940 and 11/670,243 are hereby incorporated herein by reference.

BACKGROUND OF THE INVENTION

1. Field of the Invention

This invention generally relates to a bicycle wheel securing structure. More specifically, the present invention relates to a bicycle wheel securing structure, which includes outer and inner axles coupled together, and an adjustment structure.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle hub attachment mechanism.

In the past various bicycle parts have been attached using nut and bolt arrangements. However, while certain bicycle parts are designed to be permanently attached to the bicycle, other bicycle parts such as bicycle wheels need to be loosened and removed relatively often. For example, bicycle wheels need to be removed from the frame whenever there is a flat tire. Moreover, bicycle wheels often need to be removed in order to transport a bicycle in an automobile.

Due to the need to remove and reinstall bicycle wheels, bicycle wheel hubs have been provided with quick release mechanisms in order to facilitate easier removal and reinstallation of the wheels. A typical quick release device includes a skewer with a threaded end having a quick release member mounted at the other end. The quick release member includes a base with a lever and a cam structure. A nut is detachably threaded onto the threaded end of the skewer after the skewer is inserted through the hub body. The fork flanges of the frame are arranged adjacent the base of the quick release member and the hub body and between the nut and the hub body, respectively. Thus, the hub can be attached to the frame by clamping the fork flanges using the quick release lever. While these typical quick release mechanisms generally work well, a tighter connection between the hub and frame has been in demand for some riders.

Thus, bicycle hubs have been designed with an axle that threadedly attaches directly to the bicycle frame. With this type of hub, a knob is provided on the end of the hub axle opposite the threaded end. The knob is used to rotate the axle during installation to both tighten the axle to the frame and to clamp one fork flange between the knob and the hub. With this type of hub, a tighter connection between the hub and the frame is possible as compared to typical quick release hubs. However, it can be difficult for some individuals to tighten such a knob. Specifically, with this type of hub, the tightness of the connection between the hub and the frame at least partially depends on the individual installing the hub (i.e., the strength of the individual). Individuals that have difficulty tightening the knob to the desired tightness level may need a tool in order to achieve the desired level of tightness.

In view of the above, it will be apparent to those skilled in the art from this disclosure that there exists a need for an improved bicycle wheel securing structure. This invention addresses this need in the art as well as other needs, which will become apparent to those skilled in the art from this disclosure.

SUMMARY OF THE INVENTION

One object of the present invention is to provide a bicycle wheel securing structure, which provides a tight connection, yet is relatively easy to tighten.

Another object of the present invention is to provide a bicycle wheel securing structure, which is relatively simple and inexpensive to manufacture and/or assemble.

The foregoing objects can basically be attained by providing a bicycle wheel securing structure, which comprises an outer axle, an inner axle, a head member, a lever member and an adjustment structure. The outer axle has a first threaded end and a second end with an internal bore extending from the second end. The inner axle is threadedly coupled to the outer axle within the internal bore of the outer axle in an installed position. The head member is disposed on an end of the inner axle extending out of the internal bore at the second end of the outer axle. The lever member is operatively mounted to move the head member in an axial direction relative to the inner axle in response to movement of the lever member. The adjustment structure is disposed between the outer axle and the inner axle such that a final position of the lever member in a rotational direction can be adjusted when a bicycle wheel is fully secured to a bicycle frame.

The foregoing objects can also basically be attained by providing a bicycle wheel securing structure, which comprises an outer axle, an inner axle, a head member, a lever member, a fixing structure and an adjustment member. The outer axle has a first threaded end and a second end with an internal bore extending from the second end. The inner axle is threadedly coupled to the outer axle within the internal bore of the outer axle in an installed position. The head member is disposed on an end of the inner axle extending out of the internal bore at the second end of the outer axle. The lever member is operatively mounted to move the head member in an axial direction relative to the inner axle in response to movement of the lever member. The fixing structure is disposed between the outer axle and the inner axle to releasably prevent axial removal of the inner axle from the internal bore of the outer axle when the inner axle is in the installed position. The adjustment member is axially adjustably coupled to the head member such that the adjustment member selectively moves between a plurality of axial positions with an axially facing abutment surface moving axially with respect to the head member when the adjustment member is adjusted between the axial positions, the fixing structure and the adjustment member cooperate together to adjust a final position of the lever member in a rotational direction with respect to the outer axle These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 14 is an enlarged perspective view of a bicycle wheel securing axle in accordance with a second embodiment;

FIG. 20 is an enlarged, partial cross-sectional view of a portion of a frame and a rear hub with a wheel securing axle in accordance with a seventh embodiment, with the wheel securing axle in a first, partially installed position;

FIG. 21 is an enlarged, partial perspective view of parts of the wheel securing axle illustrated in FIG. 20;

FIG. 31 is a longitudinal elevational view of the assembled inner axle, head member and lever member of the wheel securing axle illustrated in FIGS. 24-30;

FIG. 32 is a longitudinal elevational view of the outer axle of the wheel securing axle illustrated in FIGS. 24-30;

FIG. 33 is an enlarged, elevational view of the set screw of the wheel securing axle illustrated in FIGS. 24-30;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
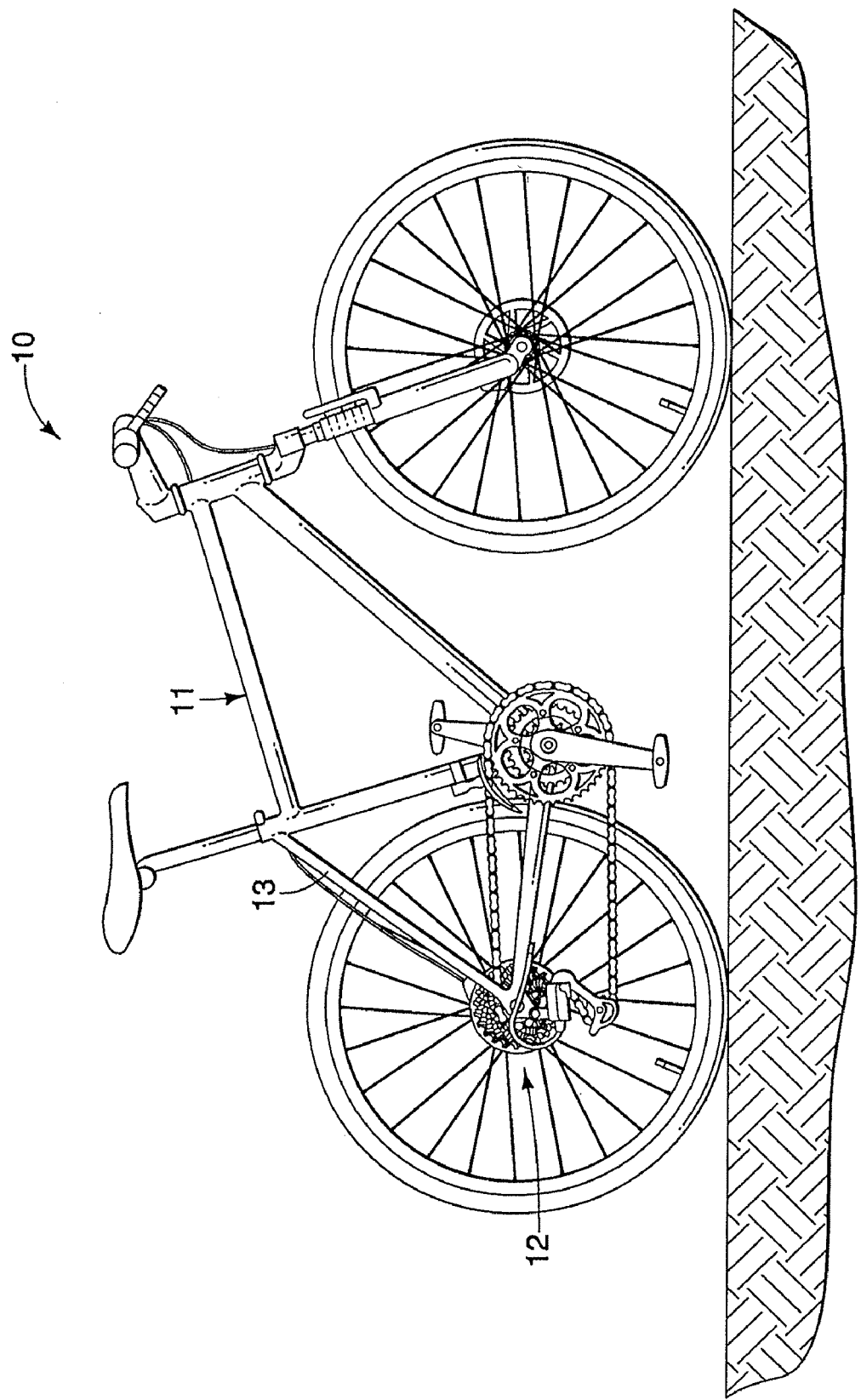
FIG. 1 is a side elevational view of a bicycle with a rear bicycle hub coupled thereto in accordance with a first embodiment.
Figure 2:
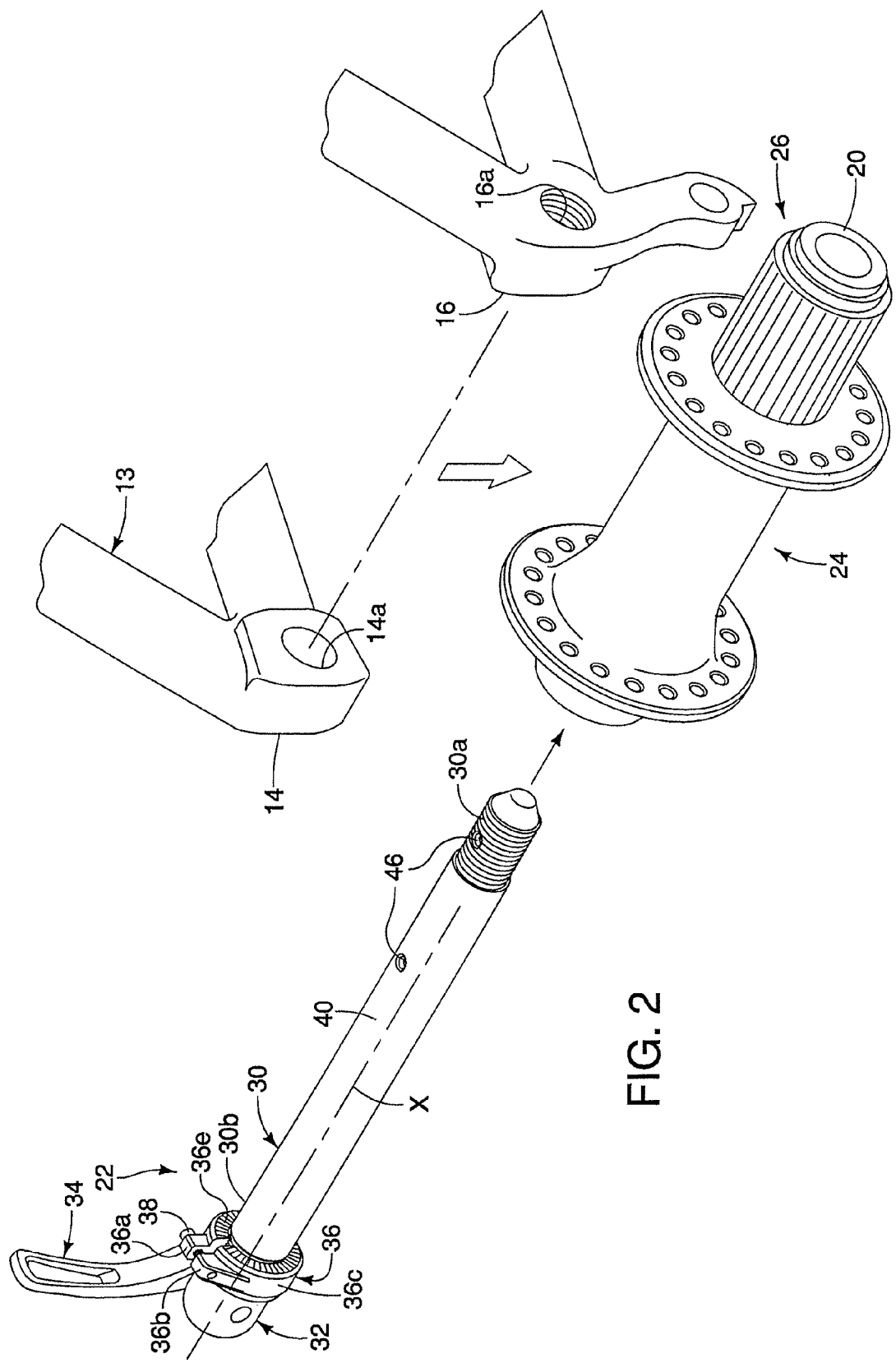
FIG. 2 is an enlarged, exploded perspective view of a portion of the frame and the rear hub illustrated in FIG. 1.

Referring initially to FIGS. 1 and 2, a bicycle 10 is illustrated, which has a rear bicycle hub 12 coupled thereto in accordance with a first embodiment. The rear hub 12 is attached the frame 11 of the bicycle 10 using a bicycle wheel securing structure or axle 22 in accordance with the present invention. Specifically, the frame 11 includes a rear fork or triangle 13 with a pair of hub mounting flanges 14 and 16 formed at the free ends thereof. Preferably, one end of the wheel securing axle 22 is directly threadedly attached to the mounting flange 16, while the other end has a wheel securing mechanism that is used to securely attach the wheel securing axle 22 to the other mounting flange 14.

The bicycle 10 is conventional, except for the rear hub 12 having the wheel securing axle 22. Accordingly, the bicycle 10 and its various components will not be discussed and/or illustrated in detail herein, except as related to the rear hub 12 and the wheel securing axle 22. Moreover, it will be apparent to those skilled in the bicycle art from this disclosure that various modifications can be made to the bicycle 10 and its components without departing from the present invention.

Referring to FIGS. 2-8, the rear bicycle hub 12 includes a main hub axle 20, the wheel securing axle 22, a hub assembly 24 and a freewheel 26. The rear hub 12 is conventional, except for the wheel securing axle 22. Accordingly, the rear hub 12 will not be discussed and/or illustrated in detail herein, except as related to the wheel securing axle 22 of the present invention. A hub shell (outline shown in broken lines) of the hub assembly 24 and the free wheel 26 are rotatably supported on the main hub axle 20 of the rear hub 12 via a bearing assembly and/or other conventional parts in a conventional manner. The wheel securing axle 22 extends through the main hub axle 20. Thus, forward rotation of rear sprockets mounted on the free wheel 26 transmits torque to the hub assembly 24. The hub assembly 24 is coupled to the rear rim via a plurality of spokes in a conventional manner to transmit the forward rotation of the hub assembly 24 to the rear rim (tire).

While the wheel securing axle 22 of the present invention is particularly suited for use with a rear hub such as the rear hub 12 disclosed herein, it will be apparent to those skilled in the bicycle art from this disclosure that the wheel securing axle 22 of the present invention could be used in other types of rear hubs (e.g. internally geared hubs) as well as in various front hubs.

Referring to FIGS. 2-13, the bicycle wheel securing axle 22 basically includes a shaft member 30, a head member 32, a lever member 34 and an adjustment member 36. The shaft member 30 has a first threaded end 30a and a second end 30b with a center axis X extending between the first and second ends 30a and 30b, as seen in FIGS. 2-5. A direction parallel to the center axis X will be considered an axial/longitudinal direction, while a direction perpendicular to the center axis X will be considered a transverse direction.

The first threaded end 30a is designed to be directly threadedly attached to the mounting flange 16. The second end 30b supports the head member 32. The lever member 34 is operatively mounted between the shaft member 30 and the head member 32 to move the shaft member 30 in an axial direction relative to the head member 32 in response to movement of the lever member 34. The adjustment member 36 is axially adjustably coupled to the head member 32 such that an axial position of the adjustment member 36 can be adjusted relative to the shaft member 30 and the head member 32, as explained below in more detail.

The shaft member 30 basically includes an outer axle 40 and an inner axle 42 releasably attached within the outer axle 40 in an installed position, as seen in FIGS. 4 and 6-8. The outer axle 40 and the inner axle 42 are preferably releasably attached together via a threaded connection 44 to releasably prevent axial removal of the inner axle 42 from the outer axle 40 when the inner axle 42 is in the installed position.

Referring to FIGS. 2-4, 6-8 and 10, the outer axle 40 basically includes a first externally threaded end 40a, a second end 40b, an outer rod portion 40c, an internal bore 40d and a pair of transverse threaded bores 40e. The threaded end 40a is preferably directly threadedly attached to the mounting flange 16. The second end 40b is attached to the mounting flange 14. The outer axle 40 preferably has a circular external shape, as viewed along the center axis X, as best understood from FIG. 3. The outer axle 40 is preferably constructed of a lightweight rigid material such as a metallic material utilizing conventional manufacturing techniques such as casting and/ or machining. In this embodiment, the outer axle 40 is preferably constructed as a one-piece, unitary member.

Figure 8:
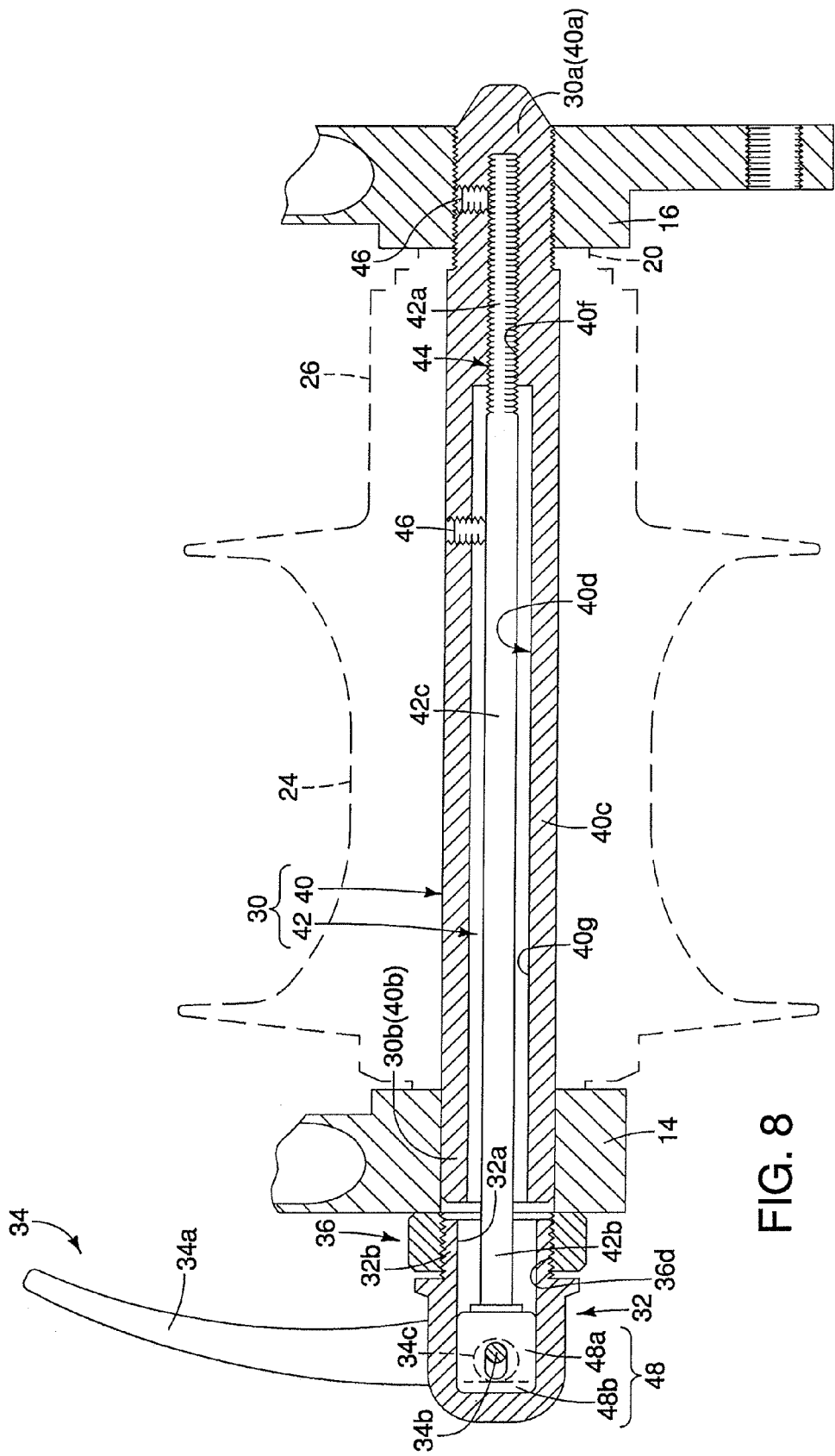
FIG. 8 is an enlarged, partial cross-sectional view of a portion of the frame and the rear hub illustrated in FIG. 1, with the wheel securing axle in a fully installed position after clamping the frame using the wheel securing lever.

The mounting flange 16 has a threaded bore 16a that is preferably a closed bore with a continuous annular female threads (i.e., preferably not a slot), which receives the first threaded end 40a. In this embodiment, the mounting flange 14 has an unthreaded bore 14a that is preferably a closed bore with a continuous annular surface (i.e., preferably not a slot), which receives the second end 40b. However, it will be apparent to those skilled in the bicycle art from this disclosure that outer axle 40 could be attached to a flange 14 having an open ended slot if needed and/or desired. The outer axle 40 of the shaft member 30 is preferably dimensioned and tightened to the mounting flange 16 such that the second end 40b of the outer axle 40 adjacent the head member 32 does not project beyond an outer axially facing surface of the mounting flange 14, as seen in FIG. 8.

The outer rod portion 40c extends between the first and second ends 40a and 40b, and preferably has an external surface which is illustrated as having a substantially uniform, circular shape. However, it will be apparent to those skilled in the bicycle art from this disclosure that the external surface of the outer rod portion 40c could have other configurations as needed and/or desired.

In this embodiment, the internal bore 40d is a stepped, blind bore with a threaded section 40f arranged at the first threaded end 40a of the outer axle 40 and an enlarged unthreaded section 40g extend from the threaded section 40e to an open end at the second end 40b. The inner axle 42 is threadedly attached to the threaded section 40f of the internal bore 40d. The inner axle 42 extends out of the unthreaded section 40g of the internal bore 40d. Thus, the inner axle 42 extends from the second end 40b of the outer axle 40 when the inner axle 42 is in the installed position. The head member 32 is preferably attached to an end of the inner axle 42 extending out of the internal bore 40d, as explained below. The stepped internal bore 40d preferably has a circular internal shape, as viewed along the center axis X.

One or more set screws 46 are preferably threadedly mounted in the transverse threaded bores 40e to releasably prevent relative rotation of the inner axle 42 within the internal bore 40d when the inner axle 42 is in the installed position, as explained below. Thus, the set screws 46 are preferably disposed between the outer axle 40 and the inner axle 42 to releasably prevent relative rotation of the inner axle 42 within the internal bore 40d when the inner axle 42 is in the installed position. The transverse threaded bores 40e extend between an external surface of the outer axle 40 and the internal bore 40d. Even though two set screws 46 and two transverse threaded bores 40e are illustrated herein, one set screw 46 and one transverse threaded bore 40e may be provided.

Referring to FIGS. 2-4 and 6-9, the inner axle 42 basically includes a first threaded end 42a, a second end 42b, an inner rod portion 42c and a bracket 48. The first threaded end 42a is threadedly attached to the threaded section 40f of the internal bore 40d. The first threaded end 42a and the threaded section 40f constitute parts of the threaded connection 44 when coupled together. The a second end 42b extends out of the unthreaded section 40g of the internal bore 40d. The second end 42b supports the head member 32 and the lever member 34. Specifically, the second end 42b of the inner axle 42 has the bracket 48 attached thereto, which supports the head member 32 and the lever member 34. The inner rod portion 42c extends between the first and second ends 42b and 42c. In this embodiment, the inner rod portion 42c of the inner axle 42 includes a smooth outer surface section and one of the set screws 46 of the fixing structure releasably frictionally contacts the smooth outer surface section to prevent relative rotation between the outer axle 40 and the inner axle 42 in an area between the threaded connection 44 and the head member 32.

Figure 3:
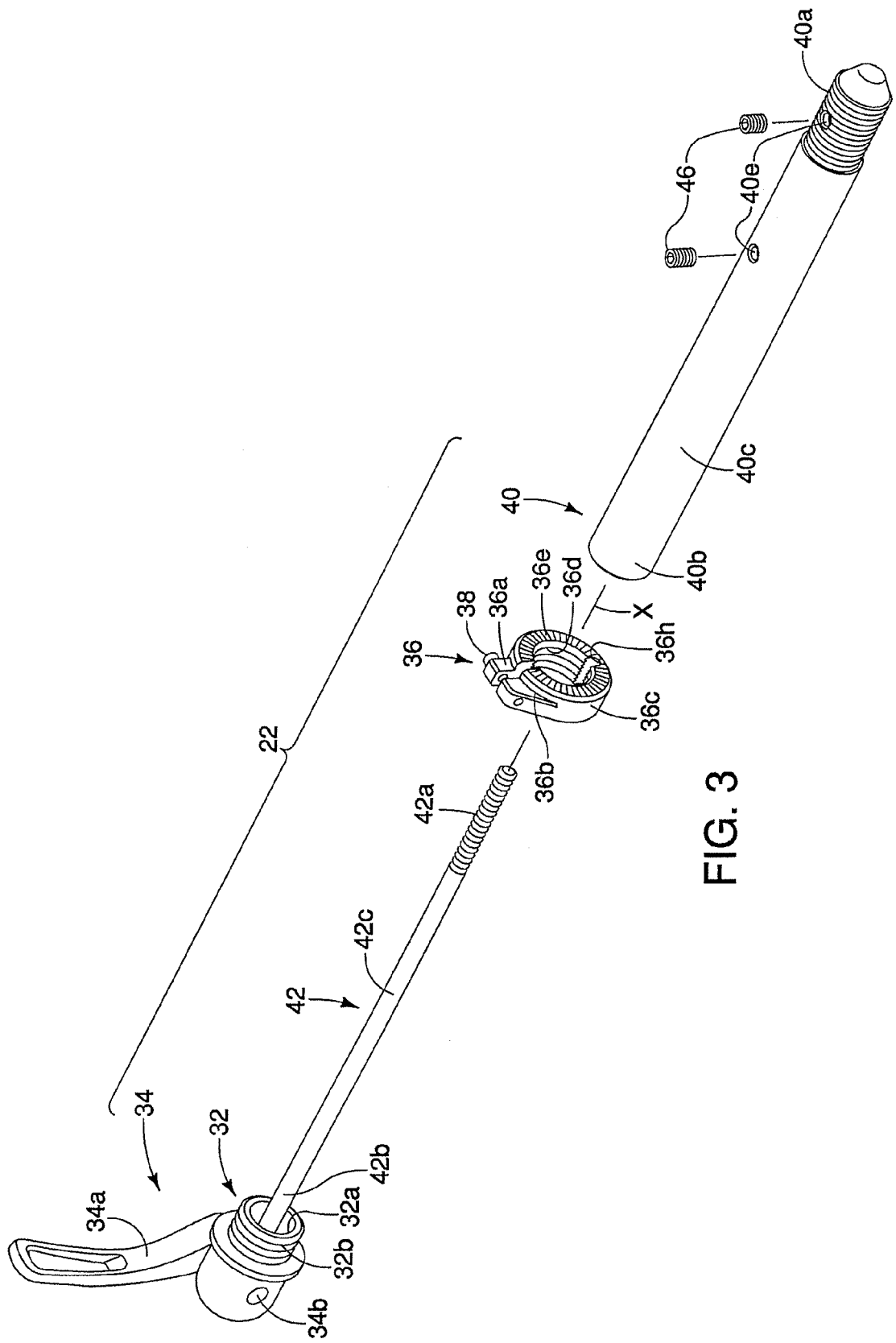
FIG. 3 is an exploded, perspective view of the wheel securing axle of the rear hub illustrated in FIG. 2.
Figure 4:
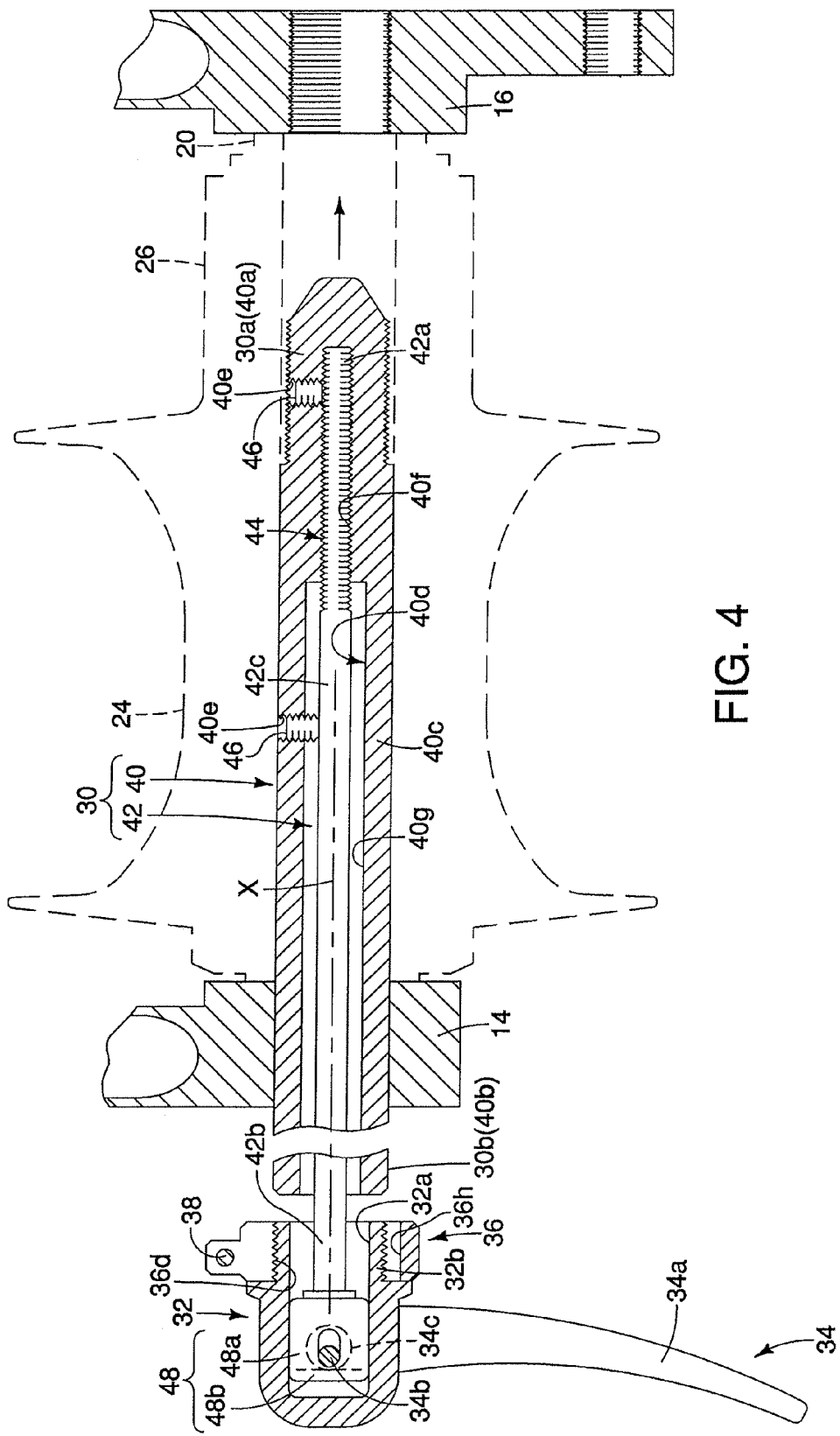
FIG. 4 is an enlarged, partial cross-sectional view of a portion of the frame and the rear hub illustrated in FIG. 1, with the wheel securing axle in a first, partially installed position.
Figure 5:
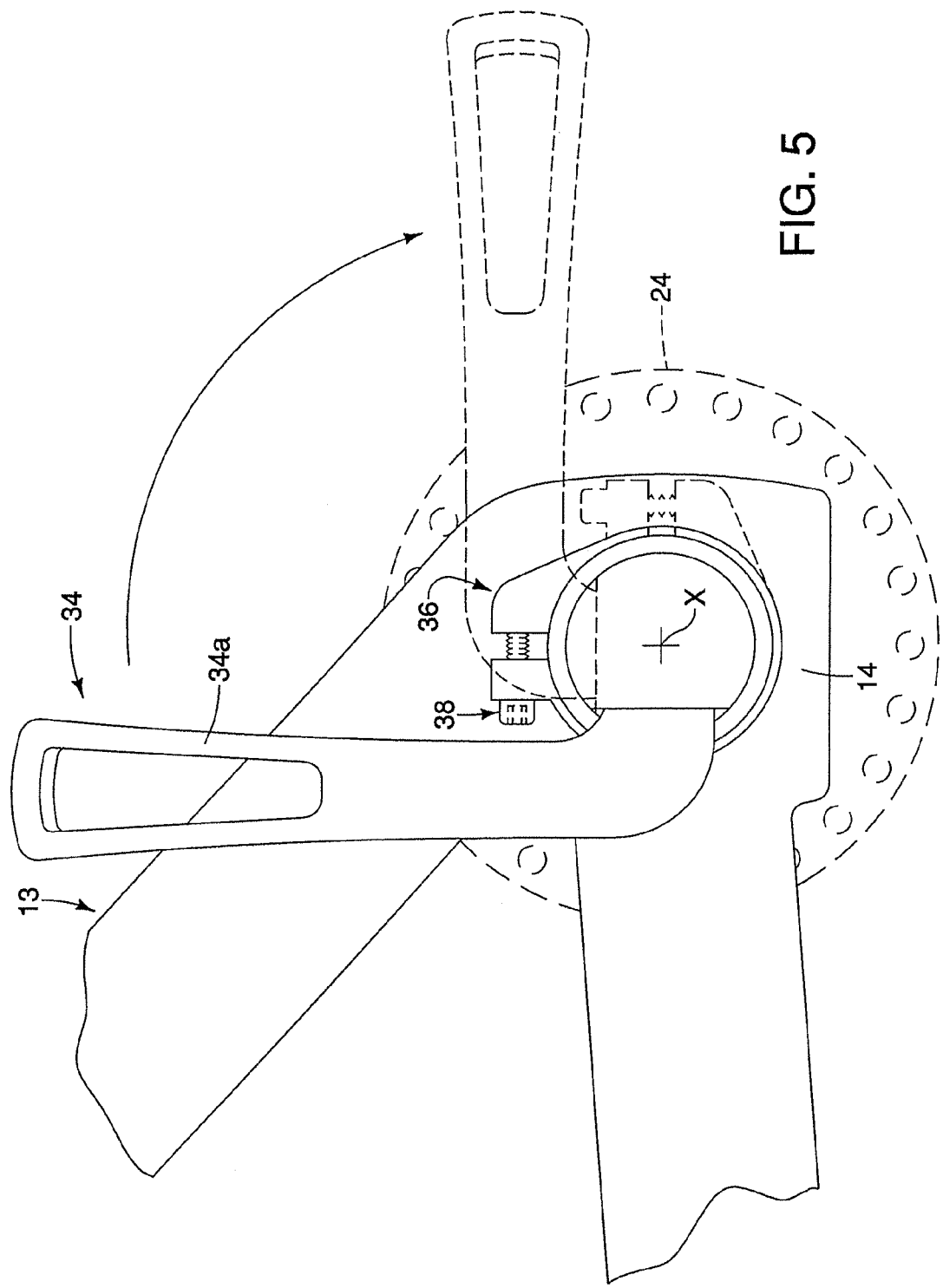
FIG. 5 is an enlarged, end elevational view of the portion of the frame and the rear hub illustrated in FIG. 4, illustrating rotation of the wheel securing axle from the first, partially installed position.
Figure 6:
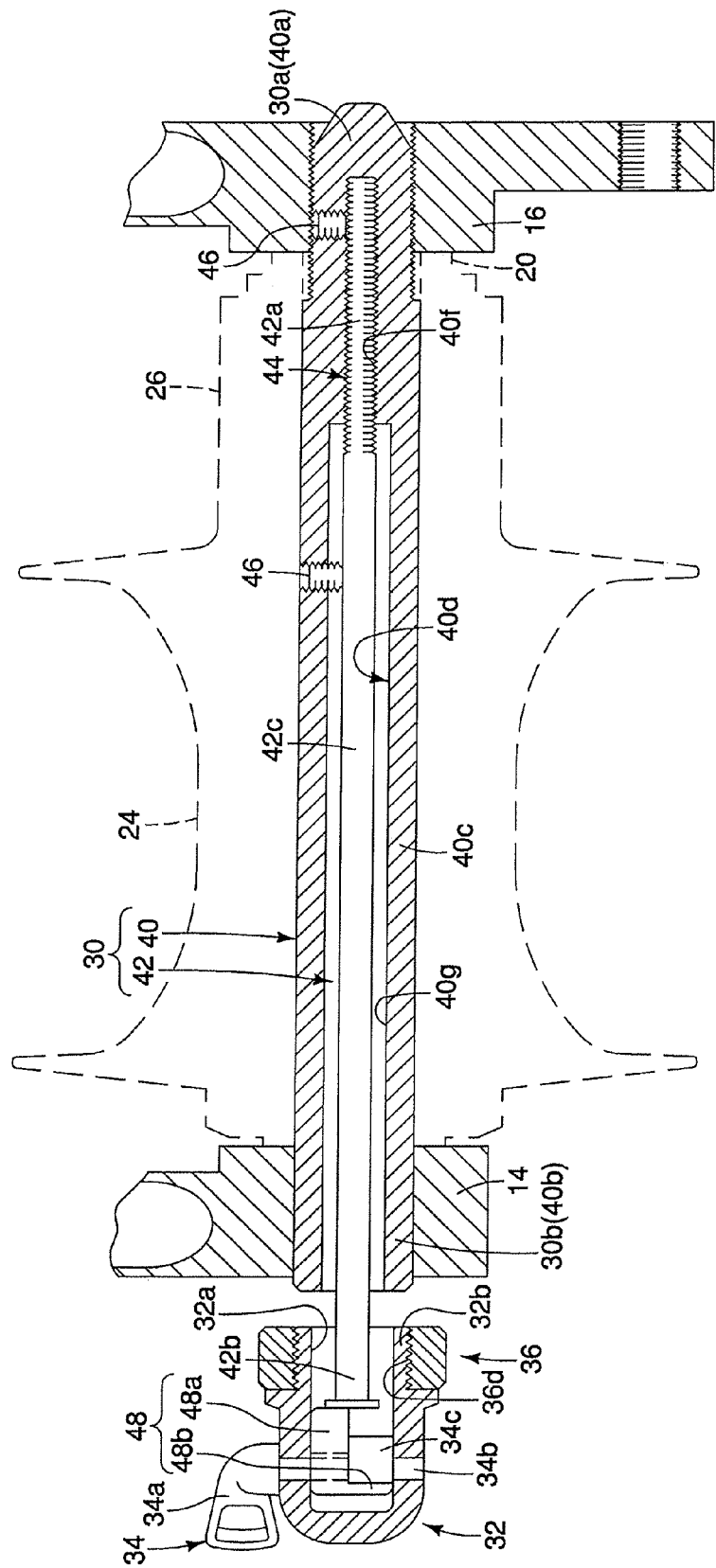
FIG. 6 is an enlarged, partial cross-sectional view of a portion of the frame and the rear hub illustrated in FIG. 1, with the wheel securing axle in a second, partially installed position (i.e. during rotation as illustrated in FIG. 5)

The inner axle 42 preferably has a circular shape as viewed along the center axis X, except for the bracket 48 arranged on the second end 42b, which extends out of the internal bore 40d, as best understood from FIGS. 3, 4 and 6. The inner axle 42 is preferably constructed of a lightweight rigid material such as a metallic material utilizing conventional manufacturing techniques such as casting and/or machining. In this embodiment, the inner axle 42 can constructed as a one-piece, unitary member together with the bracket 48, or the bracket 48 can be constructed as a separate member that is fixed to the inner axle 42 (e.g. by welding or the like).

The bracket 48 preferably includes a support portion 48a with a longitudinal slot, and a cam portion 48b in an L-shaped configuration. The support portion 48a with the slot receives part of the lever member 34 therethrough, as explained below. The cam portion 48b that has a cam surface that cooperates with a cam surface of the lever member 34 to move the inner axle 42 of the shaft member 30 in an axial direction relative to the head member 32 in response to movement of the lever member 34 from a release position shown in FIG. 7 to fixing position shown in FIG. 8. The bracket 48 is relatively conventional, and thus, will not be explained and/or illustrated in further detail herein.

The set screws 46 are arranged to selectively contact an external surface of the inner axle 42 when the set screws 46 are tightened, as shown in FIGS. 4 and 6-8. Specifically, the set screws 46 are threadedly (adjustably) mounted in the transverse threaded bores 40e, as mentioned above. Thus, the ends of the set screws 46 frictionally prevent rotation of the inner axle 42 relative to the outer axle 40 when tightened against the external surface of the inner axle 42. Optionally, the external surface of the inner axle 42 may include one or more recesses or dented areas 42d, such as those illustrated in FIG. 9. With such an arrangement, the inner axle 42 can further be prevented from rotating relative to the outer axle 40 when the internal ends of the set screws 46 are received in the dented areas 42d.

Figure 7:
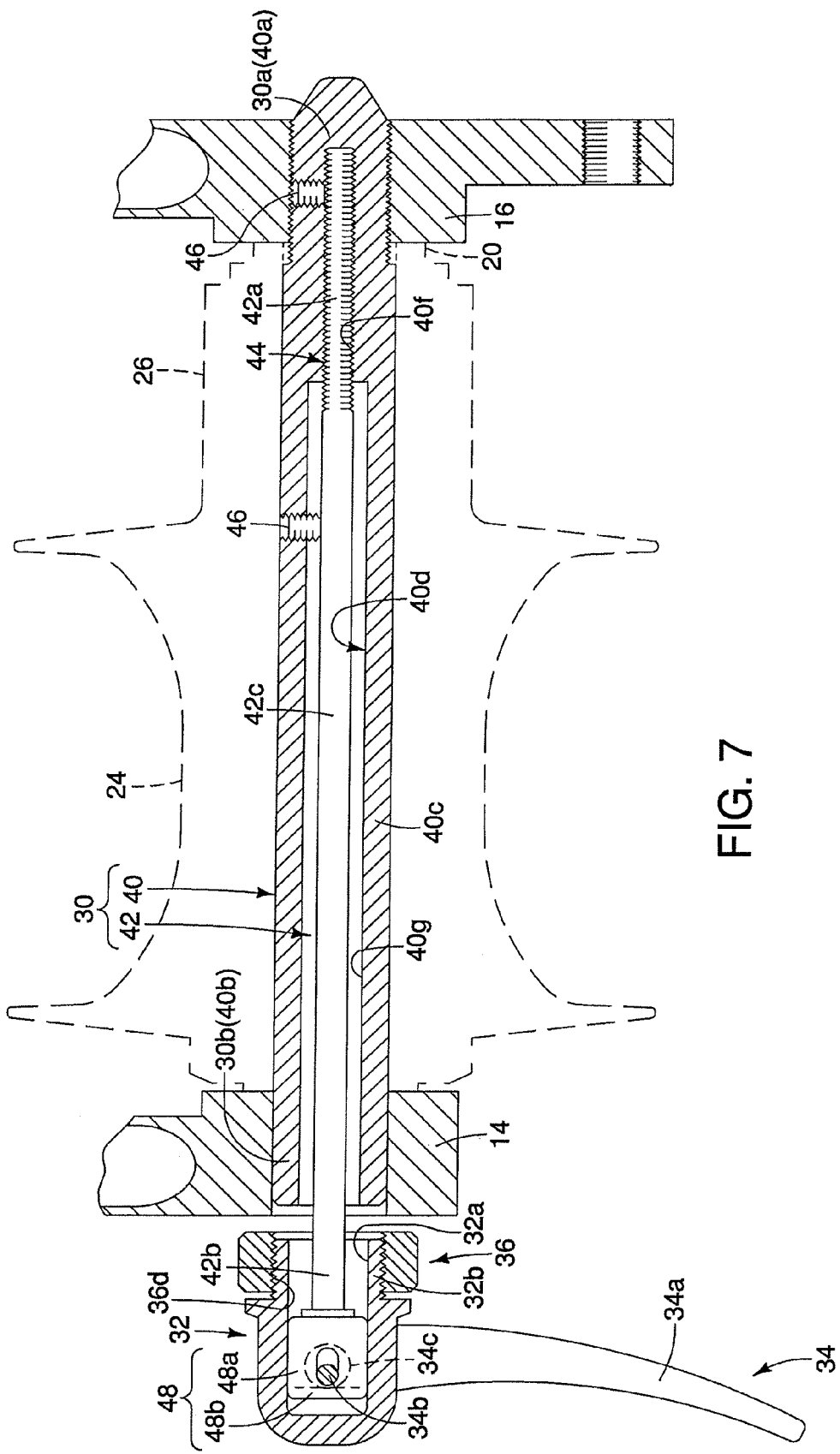
FIG. 7 is an enlarged, partial cross-sectional view of a portion of the frame and the rear hub illustrated in FIG. 1, with the wheel securing axle in a third, partially installed position (i.e. after rotation as illustrated in FIGS. 5 and 6) but prior to clamping the frame using the wheel securing lever.

Referring to FIGS. 2-8, the lever member 34 basically includes an operating lever portion 34a, a pivot pin portion 34b and a cam portion 34c. The lever member 34 is operatively mounted to move the head member 32 in an axial direction relative to the inner axle 42 in response to movement of the lever member 34. The cam portion 34c rotates with the operating lever portion 34a and contacts a cam surface of the cam portion 48b of the bracket 48. The cam surface of the cam portion 34c cooperates with the cam surface of the cam portion 48b during rotation of the operating lever portion 34a to move the head member 32 axially closer to the threaded connection 44 when the operating lever portion 34a is rotated from the release position to the fixing position, as seen in FIGS. 7 and 8, respectively. The pivot pin portion 34b is rotatably supported by the head member 32 in one or more holes in a conventional manner. The pivot pin portion 34b is also rotatably supported and longitudinally slidably supported by the support portion 48a of the bracket 48. Specifically, the pivot pin portion 34b is disposed within the slot of the support portion 48a. The lever member 34 is relatively conventional, and thus, will not be discussed and or illustrated in further detail herein.

Referring still to FIGS. 2-8, the head member 32 is basically a cup-shaped member having an internal recess 32a and a threaded section 32b. The bracket 48 of the inner axle 42 is received in the recess 32a. Also, the cam portion 34c is received in the recess 32b. The pivot pin portion 34b, extending from the operating lever portion 34a, extends in a transverse direction through the head member 32 and through the support portion 48a of the bracket 48, which is disposed within the recess 32a. The lever member 34 is preferably spaced axially outwardly from the threaded section 32b along the center axis X.

The threaded section 32b preferably has a tubular configuration with external (male) threads. The adjustment member 36 is threaded onto the externally threaded section 32b. Preferably, the externally threaded section 32b has an axial length that is the same as or slightly smaller than an axial length of the adjustment member 36 so that the adjustment member 36 will contact the mounting flange 14 in a fully assembled state, as shown in FIG. 8. In other words, the threaded section 32b alone does not contact the mounting flange 14. Thus, the adjustment member 36 is axially adjustably coupled to the head member 32 such that a final position of the lever member 34 in a rotational direction can be adjusted when a bicycle wheel is fully secured to a bicycle frame 11.

Referring now to FIGS. 2-8 and 11-13, the adjustment member 36 will now be explained in more detail. The adjustment member 36 is threadedly mounted on the externally threaded section 32b, as mentioned above. Thus, the adjustment member 36 is axially adjustably coupled to the head member 32 by rotating the adjustment member 36 relative to the head member 32. The adjustment member 36 basically has a split ring or C-shaped configuration. The adjustment member 36 basically includes a first free end 36a, a second free end 36b, a curved connecting portion 36c with an internal (female) threaded bore 36d, an axially facing abutment surface 36e, and a tightening element 38. The threaded bore 36d extends axially through the adjustment member 36. The axially facing abutment surface 36e is formed on an end of the adjustment member facing the threaded connection 44. The tightening element 38 is preferably coupled between the first and second ends 36a and 36b to selectively prevent rotation of the adjustment member 36, as explained below.

The adjustment member 36 is preferably constructed of a lightweight rigid material such as a metallic material utilizing conventional manufacturing techniques such as casting and/or machining. The first end 36a, the second end 36b and the connecting portion 36c of the adjustment member 36 are preferably integrally formed together as a one-piece, unitary member. The tightening element 38 is preferably formed as a separate member from the first end 36a, the second end 36b and the connecting portion 36c of the adjustment member 36.

Figure 13:
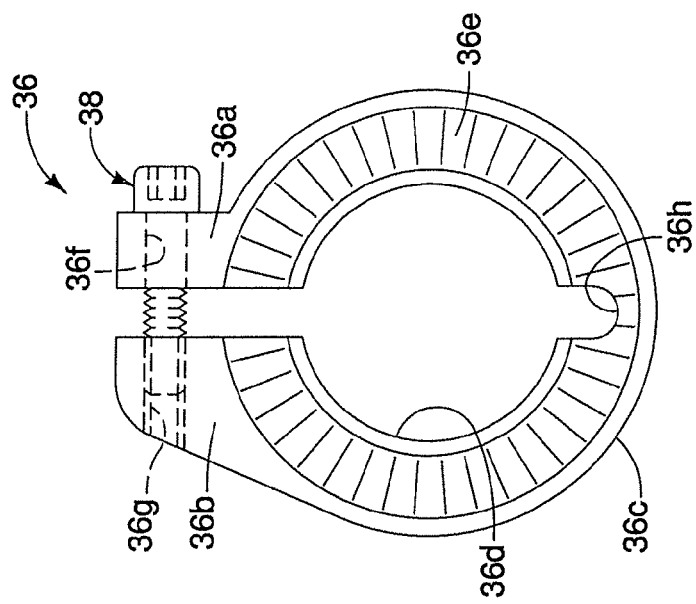
FIG. 13 is an inner end elevational view of the adjustment member illustrated in FIGS. 11 and 12.
Figure 12:
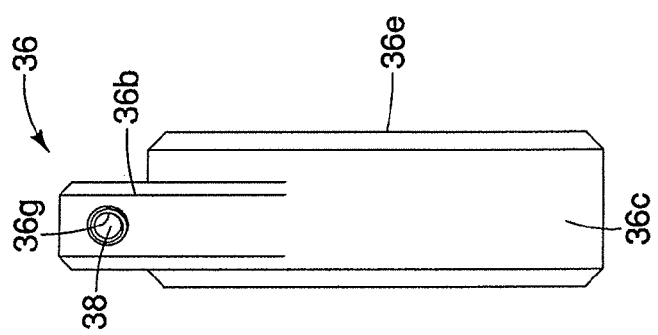
FIG. 12 is a side elevational view of the adjustment member illustrated in FIG. 11.
Figure 11:
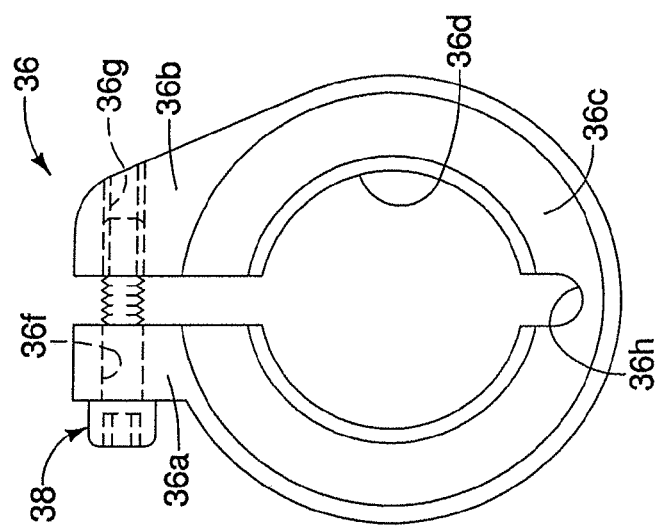
FIG. 11 is a further enlarged, outer end elevational view of the adjustment member of the wheel securing axle illustrated in FIGS. 2-8.

The first end 36a of the adjustment member 36 preferably has an unthreaded through bore 36f that is aligned with a threaded bore 36g of the second end 36b, as best seen in FIGS. 11-13. The tightening element 38 is preferably a threaded bolt or screw with a threaded shaft an enlarged head. The shaft of the tightening element 38 extends through the through bore 36f and into the threaded bore 36g to adjustably attach the first and second free ends 36a and 36b together. The head of the tightening element 38 contacts the first free end 36a of the adjustment member 36.

When the tightening element 38 is tightened (rotated to extend further into the threaded bore 36g), the internal diameter of the threaded bore 36d is reduced. On the other hand, when the tightening element 38 is loosened (rotated in the opposite direction to extend less into the threaded bore 36g), the internal diameter of the threaded bore 36d is increased. The threaded internal bore 36d preferably includes an axially extending notch 36h formed therein to facilitate tightening of the tightening element 38 to reduce the internal diameter of the threaded internal bore 36d.

If the internal diameter of the threaded bore 36d is reduced a predetermined amount by the tightening element 38, friction between the threaded bore 36d and the external threaded section 32b of the head member 32 prevents rotation of the adjustment member 36 relative to the head member 32. On the other hand, if the internal diameter of the threaded bore 36d is increased a predetermined amount by the tightening element 38, friction between the threaded bore 36d and the external threaded section 32b of the head member 32 is negligible such that free rotation of the adjustment member 36 relative to the head member 32 is permitted. In other words, varying degrees of frictional engagement between the adjustment member 36 and the head member 32 can be provided depending on how tight the tightening element 38 is (i.e., how much the tightening element 38 is rotated). Preferably, once the adjustment member 36 is located in the desired position on the head member 32 (i.e., relative to the mounting flange 14), the tightening element 38 is tightened enough to prevent rotation of the adjustment member 36 relative to the head member 32.

Because the axial position of the adjustment member 36 relative to the head member 32 is adjustable, the axial position of the abutment surface 36e of the adjustment member 36 can be adjusted relative to the head member 32. Thus, the axial position of the abutment surface 36e can be adjusted relative to the shaft member 30. The abutment surface 36e is preferably a textured surface configured to frictionally engage the mounting flange 14. The configuration of the textured axially facing abutment surface 36e is illustrated as a plurality of radially extending ridges/valleys. However, it will be apparent to those skilled in the bicycle art from this disclosure that the abutment surface 36e can have other configurations as needed and/or desired.

Referring now to FIGS. 2-13, assembly and use of the rear hub 12 having the wheel securing axle 22 in accordance with the present invention will now be explained in more detail.

Prior to mounting the rear hub 12 having the wheel securing axle 22 to the mounting flanges 14 and 16, the main hub axle 20, the hub assembly 24 and the free wheel 26 are assembled together as a unit in a conventional manner. The wheel securing axle 22 is assembled as a separate unit from the unit including the main hub axle 20, the hub assembly 24 and the free wheel 26 in accordance with the present invention.

Figure 9:
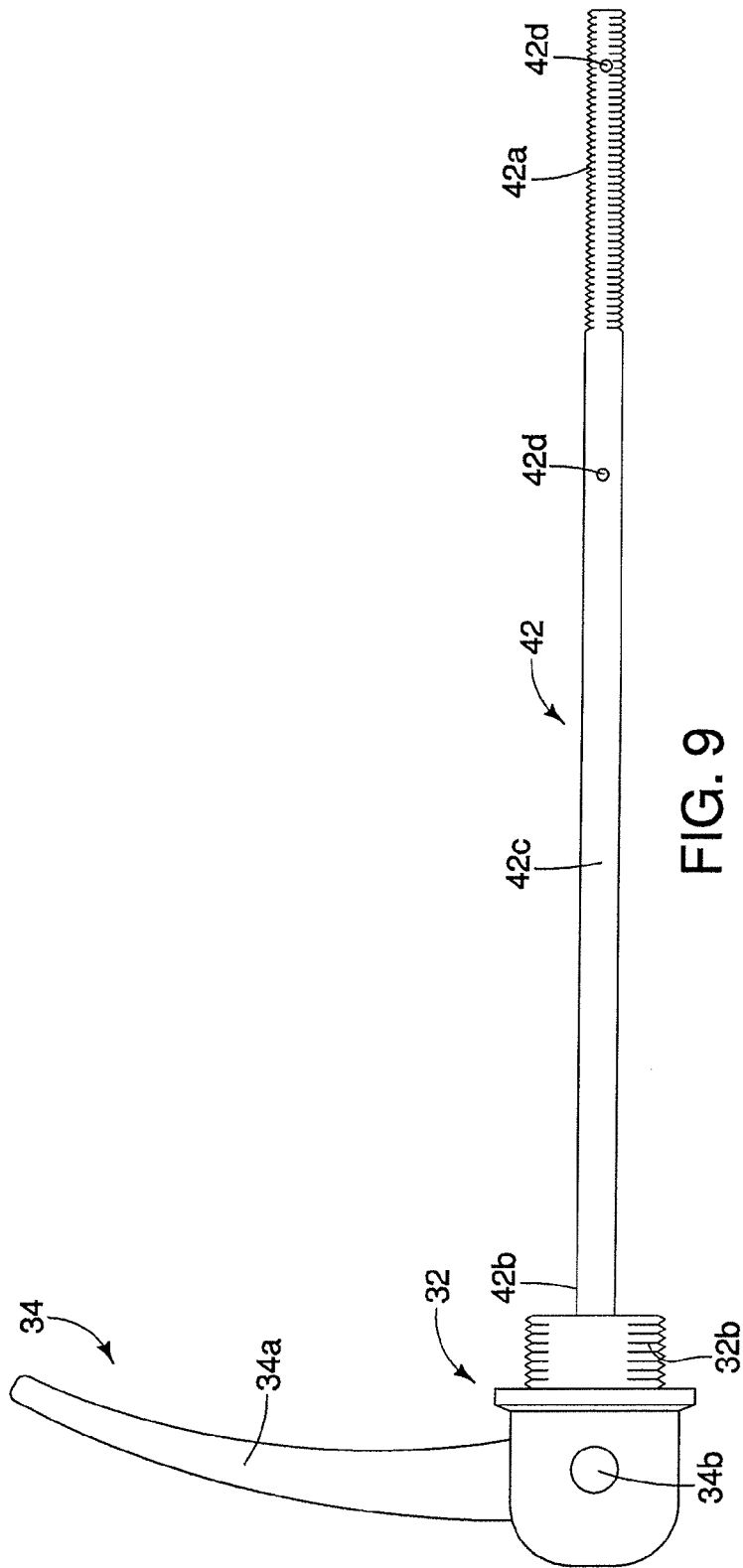
FIG. 9 is a longitudinal elevational view of the inner axle of the wheel securing axle illustrated in FIGS. 2-8.
Figure 10:
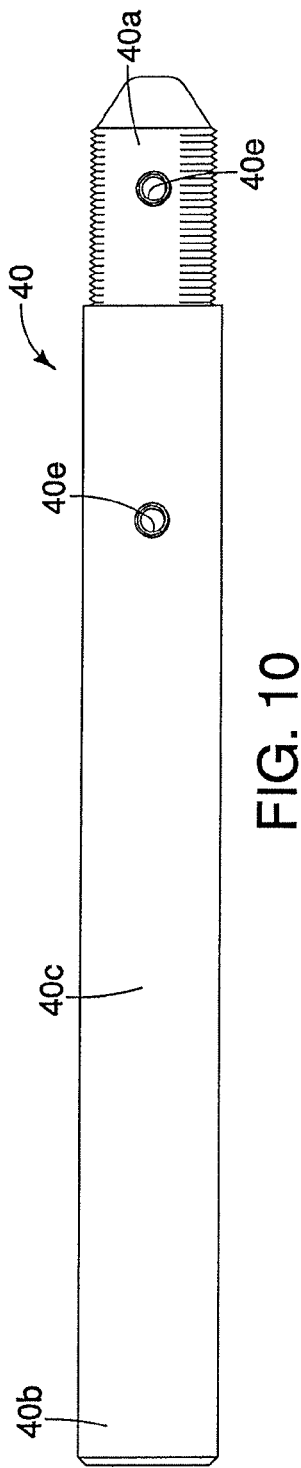
FIG. 10 is a longitudinal elevational view of the outer axle of the wheel securing axle illustrated in FIGS. 2-8.

In order to assemble the wheel securing axle 22 as a unit, the wheel securing mechanism (i.e., the head member 32, the lever member 34 and the inner axle 42) is assembled using conventional assembly techniques, as seen in FIGS. 3 and 9. The adjustment member 36 can be threaded onto the head member 32 before or after assembling the wheel securing mechanism (i.e., the head member 32, the lever member 34 and the inner axle 42), as best understood from FIG. 3. The inner axle 42 is then inserted into the internal bore 40d and threadedly attached to the outer axle 40 such that axial removal of the inner axle 42 is prevented, as best understood from FIGS. 3 and 4. Then one or more set screws 46 are coupled between the outer axle 40 and the inner axle 42 to prevent rotation of the inner axle 42 relative to the outer axle 40, as best understood from FIGS. 3 and 4. Now, the shaft member 30 is fully assembled.

The unit including the main hub axle 20, the hub assembly 24 and the free wheel 26 can now be attached to the mounting flanges 14 and 16 using the wheel securing axle 22. In order to mount the rear hub 12 to the frame 11, the unit including the main hub axle 20, the hub assembly 24 and the free wheel 26 is positioned between the mounting flanges 14 and 16. The wheel securing axle 22 is then inserted through the hole 14a of the mounting flange 14, through the main hub axle 20, the hub assembly 24 and the free wheel 26, and threaded into the threaded hole 16a of the mounting flange 16a, as best understood from FIGS. 4-7. Now, the adjustment member 36 is axially adjusted relative to the head member 32 such that moving the lever member 34 from the release position (FIG. 7) to the fixing position (FIG. 8) tightly clamps the mounting flange 14. Once the desired position of the adjustment member 36 is determined, the tightening element 38 can be tightened. By adjusting the axial position of the adjustment member 36, the final position of the lever portion 34a when the lever member 34 is completely in the fixing position can also be adjusted. Thus, a user can adjust the final position of the lever portion 34a as he/she wants, e.g. such that the lever member 34 is not accidentally in the release position by hitting against a foreign object (such as rocks, undulation of the ground or the like) during a bicycle ride.

If the rear wheel needs to be removed, the lever member 34 is moved to the release position, and then the entire wheel securing axle 22 is rotated to detach the shaft 30 from the mounting flange 16. Then the entire wheel securing axle 22 can be axially removed, and the remainder of the rear wheel can be removed from the rear triangle 13 of the bicycle frame 11. The installation procedure above can be repeated to reattach the rear hub 12 to the bicycle frame 11. While not illustrated herein, the wheel securing axle 22 can be rotated such that the abutment formed between the threaded end 30a and the outer rod portion 40c contacts the mounting flange 16. With such an arrangement, the shaft member 30 can be located in the same position relative to the mounting flange 16 (i.e. if fully tightened) every time it is installed. With such an arrangement, it is possible to leave the adjustment member 36 in the same position when removing and reinstalling the rear hub 12.

The threaded connection 44 disposed between the outer axle 40 and the inner axle 42 form part of a fixing structure (i.e., adjustment structure or adjustable fixing structure) of the shaft member 30 (disposed between the outer axle 40 and the inner axle 42), which releasably prevents axial removal of the inner axle 42 from the internal bore 40d when the inner axle 42 is in the installed position. The set screws 46 mounted in the transverse threaded holes 40e of the outer axle 40 and the external surface of the inner axle 42 also form part of the fixing structure (i.e., adjustment structure or adjustable fixing structure) of the shaft member 30 (disposed between the outer axle 40 and the inner axle 42), which releasably prevents relative rotation of the inner axle 42 within the internal bore 40d when the inner axle 42 is in the installed position. Optionally, the adjustment member 36 may also be considered part of the adjustment structure or adjustable fixing structure.

Second Embodiment

Referring now to FIG. 14, a bicycle wheel securing structure or axle 222 having a modified shaft member 230 with a modified outer axle 240 in accordance with a second embodiment of the present invention will now be explained. The wheel securing axle 222 of this second embodiment is identical to the wheel securing axle 22 of the first embodiment, except for the outer axle 240 of the shaft member 230. Accordingly, this second embodiment will not be discussed and/or illustrated in detail herein, except as related to the outer axle 240. However, it will be apparent to those skilled in the bicycle art from this disclosure that the descriptions and illustrations of the first embodiment also apply to this second embodiment, except as explained and/or illustrated herein. Moreover, it will be apparent to those skilled in the bicycle art from this disclosure that the wheel securing axle 222 is designed to replace the wheel securing axle 22 of the first embodiment to mount the unit including the main hub axle 20, the hub assembly 24 and the free wheel 26 to the frame mounting flanges 14 and 16 in the manner described above with respect to the first embodiment and as illustrated in FIGS. 1-13.

Parts of this second embodiment that are identical to parts of the first embodiment will be identified with same reference characters as the first embodiment for the sake of convenience. Parts of this second embodiment that are functionally identical (but not exactly identical) to parts of the first embodiment will be identified with the same reference characters but with "200" added thereto for the sake of convenience.

The outer axle 240 in this second embodiment includes a modified internal bore 240d that is a through bore rather than a blind bore as in the first embodiment. Otherwise, the internal bore 240d has a configuration identical to the internal bore 40d of the first embodiment. An end cap (fastening member) 241 such as a threaded bolt is attached to the free end of the outer axle 240 within the internal bore 240d. Other than the modified internal bore 240d and the end cap 241, the outer axle 240 is identical to the outer axle 40 of the first embodiment. The conical surface of the end cap 241 works as a guide portion to make the insertion of the shaft member 230 into the threaded bore 16a of the mounting flange 16 easy/accurate.

Third Embodiment

Figure 15:
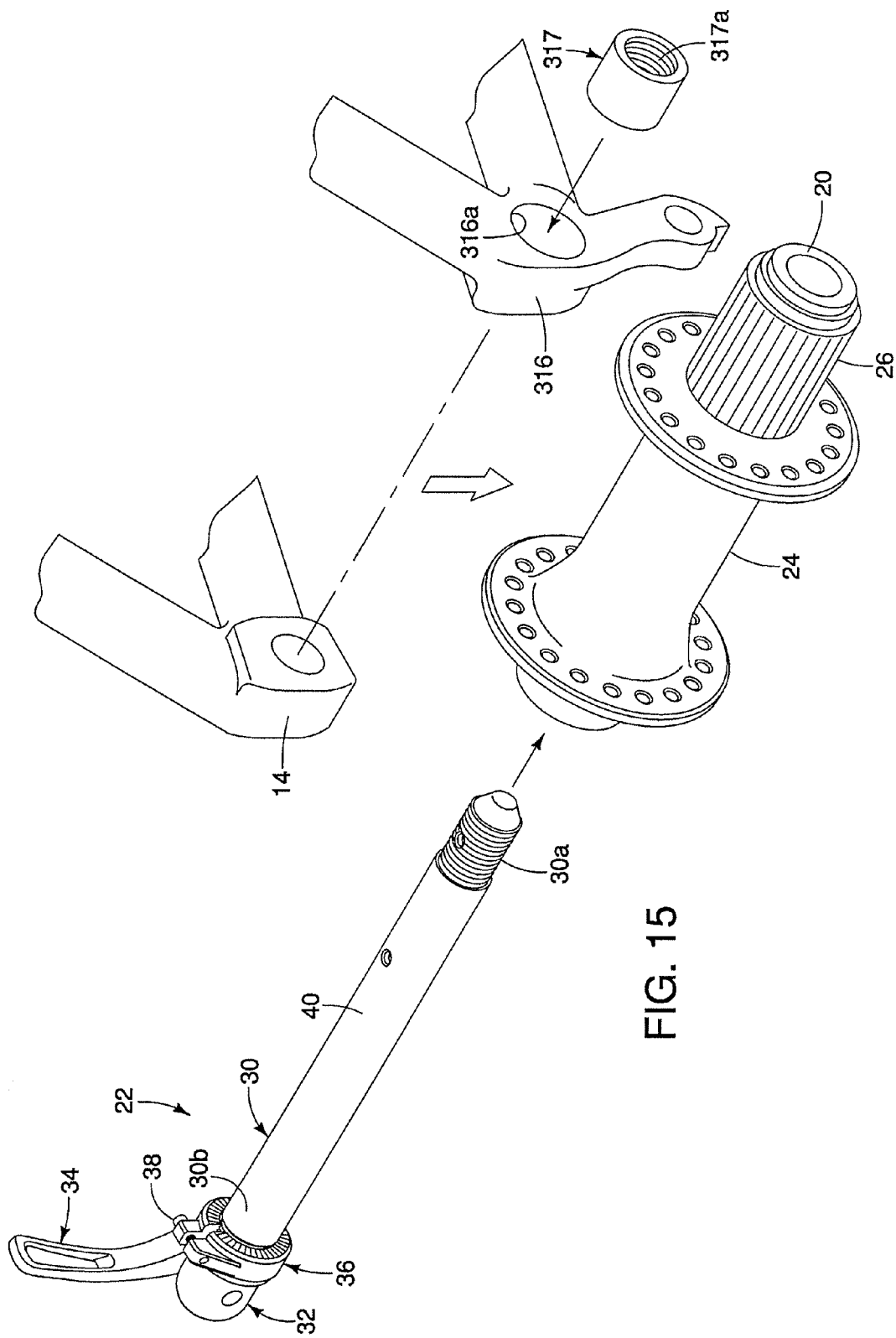
FIG. 15 is an enlarged, exploded perspective view of a portion of a frame and a rear hub in accordance with a third embodiment.

Referring now to FIG. 15, mounting the rear hub 12 with the wheel securing axle 22 of the first embodiment to a modified mounting flange 316 in accordance with a third embodiment of the present invention will now be explained. The mounting flange 316 of this third embodiment is identical to the mounting flange 16 of the first embodiment, except the mounting flange 316 includes a larger, unthreaded opening 316a with an adapter 317 received therein. Accordingly, this third embodiment will not be discussed and/or illustrated in detail herein, except as related to the mounting flange 316 and the adapter 317. However, it will be apparent to those skilled in the bicycle art from this disclosure that the descriptions and illustrations of the first embodiment also apply to this third embodiment, except as explained and/or illustrated herein. Moreover, it will be apparent to those skilled in the bicycle art from this disclosure that mounting flange 316 with the adapter 317 is designed to replace the mounting flange 16 of the first embodiment to mount the unit including the main hub axle 20, the hub assembly 24 and the free wheel 26 to the frame 11 using the wheel securing axle 22.

Parts of this third embodiment that are identical to parts of the first embodiment will be identified with same reference characters as the first embodiment for the sake of convenience. Finally, parts of this third embodiment that are functionally identical (but not exactly identical) to parts of the first embodiment will be identified with the same reference characters but with "300" added thereto for the sake of convenience.

The adapter 317 is mounted in the hole 316a of the mounting flange 316. The adapter 317 has in internal (female) threaded bore 317a having a configuration identical to the threaded bore 16a of the first embodiment to threadedly receive the first threaded end 30a of the shaft member 30. The adapter 317 is preferably non-rotatably mounted in the hole 316a via a press-fit or the like. The adapter 317 is also preferably non-axially movable relative to the mounting flange 316 when mounted in the hole 316a. In other words, the press-fit between the adapter 317 and the hole 316a is preferably sufficiently tight such that the adapter 317 is non-movably fixed within the hole 316a. Of course, it will be apparent to those skilled in the bicycle art from this disclosure that other types of non-rotational and non-axially movable connections between the adapter 317 and the hole 316a are possible if needed and/or desired. Also, it will be apparent to those skilled in the bicycle art from this disclosure that the features of this embodiment can be applied to any of the other embodiments illustrated herein.

Fourth Embodiment

Figure 16:
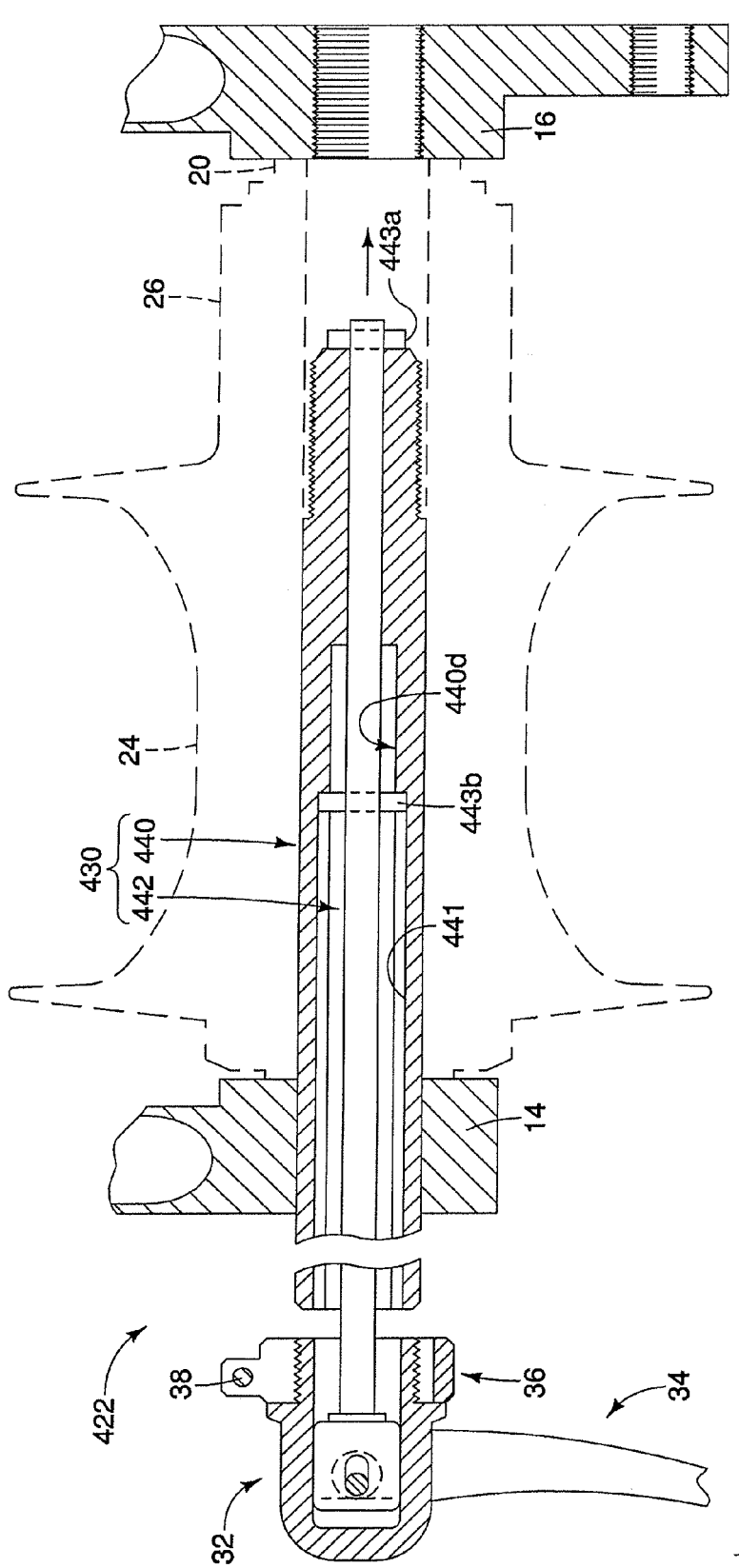
FIG. 16 is an enlarged, partial cross-sectional view of a portion of a frame and a rear hub with a wheel securing axle in accordance with a fourth embodiment, with the wheel securing axle in a first, partially installed position.
Figure 17:
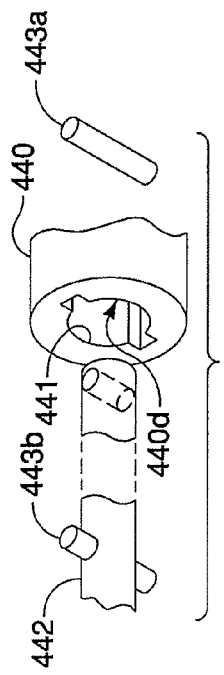
FIG. 17 is an enlarged, partial perspective view of parts of the wheel securing axle illustrated in FIG. 16.

Referring now to FIGS. 16 and 17, a bicycle wheel securing structure or axle 422 having a modified shaft member 430 in accordance with a fourth embodiment of the present invention will now be explained. The wheel securing axle 422 of this fourth embodiment is identical to the wheel securing axle 22 of the first embodiment, except for the shaft member 430. Accordingly, this fourth embodiment will not be discussed and/or illustrated in detail herein, except as related to the shaft member 430. However, it will be apparent to those skilled in the bicycle art from this disclosure that the descriptions and illustrations of the first embodiment also apply to this fourth embodiment, except as explained and/or illustrated herein. Moreover, it will be apparent to those skilled in the bicycle art from this disclosure that the wheel securing axle 422 is designed to replace the wheel securing axle 22 of the first embodiment to mount the unit including the main hub axle 20, the hub assembly 24 and the free wheel 26 to the frame mounting flanges 14 and 16 in the manner described above with respect to the first embodiment and as illustrated in FIGS. 1-13.

Parts of this fourth embodiment that are identical to parts of the first embodiment will be identified with same reference characters as the first embodiment for the sake of convenience. Parts of this fourth embodiment that are functionally identical (but not exactly identical) to parts of the first embodiment will be identified with the same reference characters but with "400" added thereto for the sake of convenience.

The shaft member 430 includes a modified outer axle 440 and a modified inner axle 442 that are attached together using a modified fixing structure to prevent axial removal of the inner axle 442 from the outer axle 440 and to prevent relative rotation between the inner axle 442 and the outer axle 440. The threaded connection 44 and the set screws 46 of the first embodiment have been eliminated in this fourth embodiment. Instead, in this fourth embodiment, the outer axle 440 includes a stepped internal through bore 440d that is unthreaded and includes a non-circular engagement section 441 configured to non-rotatably engage the inner axle 440. The inner axle 442 has an end pin 443a that is press-fitted in a transverse bore at a free end of the inner axle 442 after inserting the inner axle 442 through the internal bore 440d to prevent axial removal of the inner axle 442 from the outer axle 440. The inner axle 442 also preferably includes an intermediate pin 443b press fitted in a transverse bore prior to inserting the inner axle 442 through the internal bore 440d in order to non-rotatably engage the engagement section 441. The adjustment member 36 together with the modified fixing structure of this embodiment can be considered parts of a modified adjustment structure or adjustable fixing structure.

Fifth Embodiment

Figure 18:
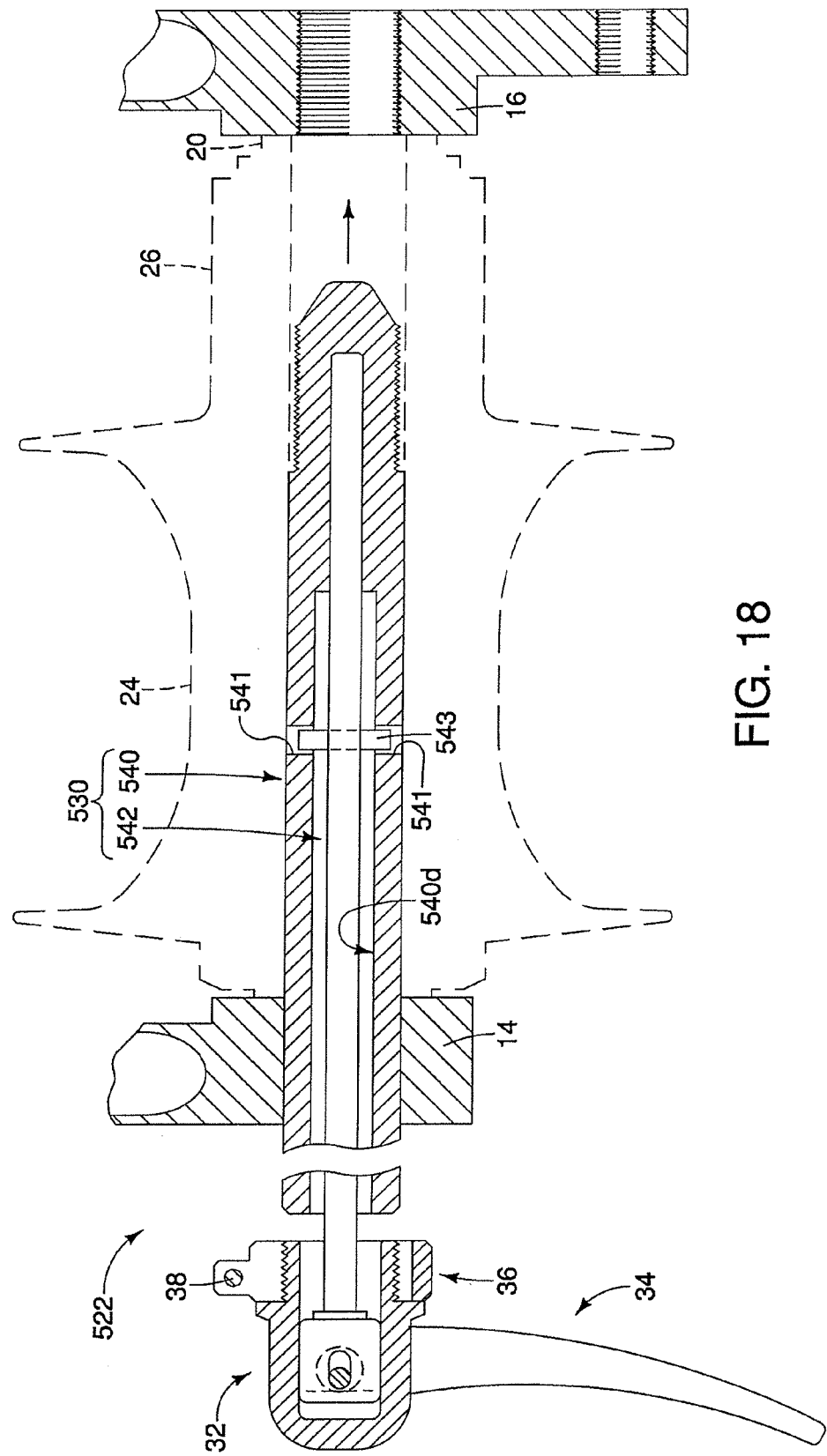
FIG. 18 is an enlarged, partial cross-sectional view of a portion of a frame and a rear hub with a wheel securing axle in accordance with a fifth embodiment, with the wheel securing axle in a first, partially installed position.

Referring now to FIG. 18, a bicycle wheel securing structure or axle 522 having a modified shaft member 530 in accordance with a fifth embodiment of the present invention will now be explained. The wheel securing axle 522 of this fifth embodiment is identical to the wheel securing axle 22 of the first embodiment, except for the shaft member 530. Accordingly, this fifth embodiment will not be discussed and/or illustrated in detail herein, except as related to the shaft member 530. However, it will be apparent to those skilled in the bicycle art from this disclosure that the descriptions and illustrations of the first embodiment also apply to this fifth embodiment, except as explained and/or illustrated herein. Moreover, it will be apparent to those skilled in the bicycle art from this disclosure that the wheel securing axle 522 is designed to replace the wheel securing axle 22 of the first embodiment to mount the unit including the main hub axle 20, the hub assembly 24 and the free wheel 26 to the frame mounting flanges 14 and 16 in the manner described above with respect to the first embodiment and as illustrated in FIGS. 1-13.

Parts of this fifth embodiment that are identical to parts of the first embodiment will be identified with same reference characters as the first embodiment for the sake of convenience. Parts of this fifth embodiment that are functionally identical (but not exactly identical) to parts of the first embodiment will be identified with the same reference characters but with "500" added thereto for the sake of convenience.

The shaft member 530 includes a modified outer axle 540 and a modified inner axle 542 that are attached together using a modified fixing structure to prevent axial removal of the inner axle 542 from the outer axle 540 and to prevent relative rotation between the inner axle 542 and the outer axle 540. The threaded connection 44 and the set screws 46 of the first embodiment have been eliminated in this fifth embodiment. Instead, in this fifth embodiment, the outer axle 540 includes a stepped internal blind bore 540d that is unthreaded and a pair of aligned pin mounting holes 541 extending between an external surface of the outer axle 540 and the internal bore 540d. The inner axle 542 has an intermediate pin 543 (like the pins 443a and 443b of the fourth embodiment) that is press-fitted in a transverse bore that is aligned with the pin mounting holes 541 after inserting the inner axle 542 completely into the internal bore 540d. The intermediate pin 543 engages the pin mounting holes 541 to prevent axial removal of the inner axle 542 from the outer axle 540, and to prevent relative rotation between the inner axle 542 and the outer axle 540. The adjustment member 36 together with the modified fixing structure of this embodiment can be considered parts of a modified adjustment structure or adjustable fixing structure.

Sixth Embodiment

Figure 19:
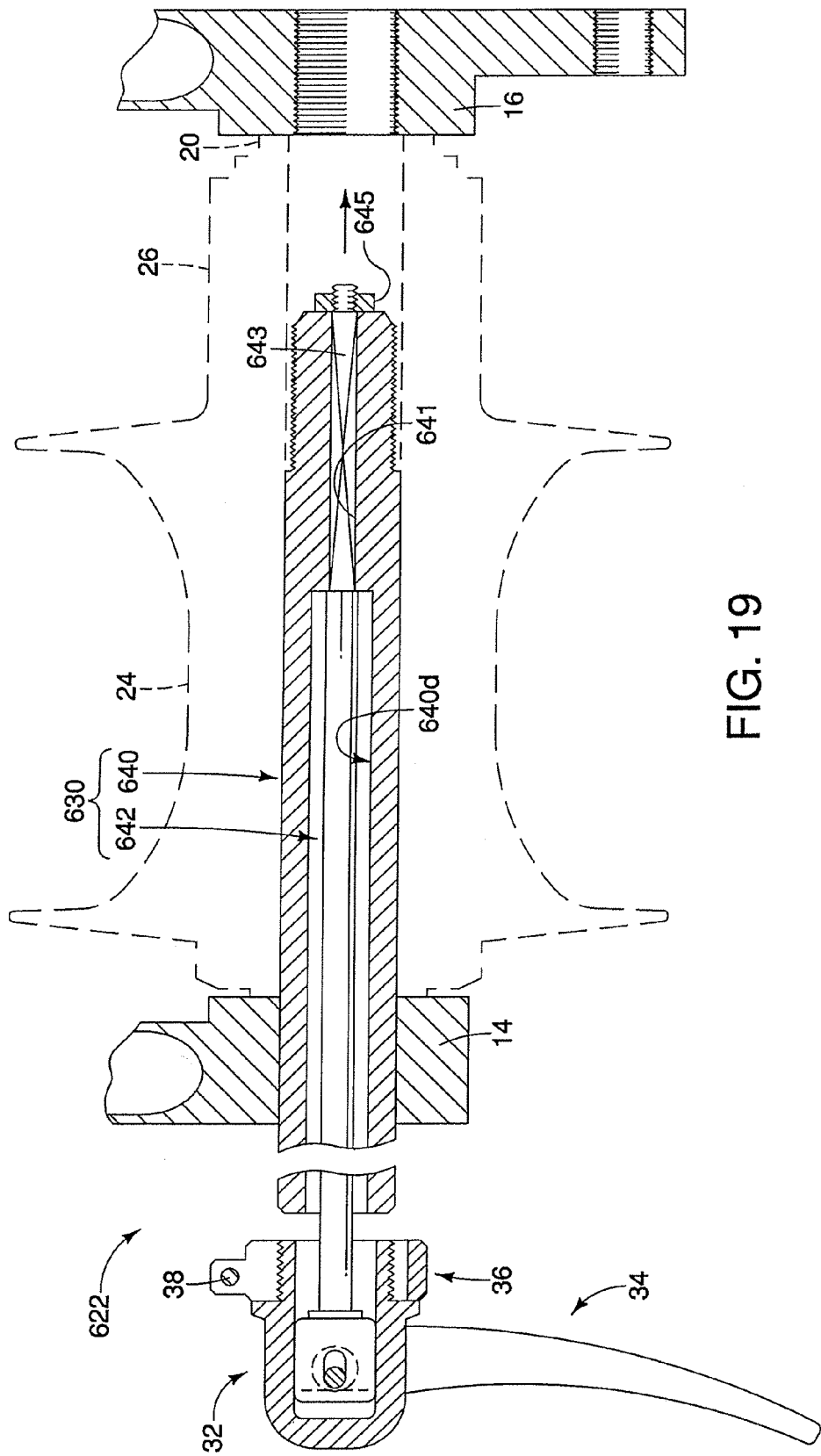
FIG. 19 is an enlarged, partial cross-sectional view of a portion of a frame and a rear hub with a wheel securing axle in accordance with a sixth embodiment, with the wheel securing axle in a first, partially installed position.

Referring now to FIG. 19, a bicycle wheel securing structure or axle 622 having a modified shaft member 630 in accordance with a sixth embodiment of the present invention will now be explained. The wheel securing axle 622 of this sixth embodiment is identical to the wheel securing axle 22 of the first embodiment, except for the shaft member 630. Accordingly, this sixth embodiment will not be discussed and/or illustrated in detail herein, except as related to the shaft member 630. However, it will be apparent to those skilled in the bicycle art from this disclosure that the descriptions and illustrations of the first embodiment also apply to this sixth embodiment, except as explained and/or illustrated herein. Moreover, it will be apparent to those skilled in the bicycle art from this disclosure that the wheel securing axle 622 is designed to replace the wheel securing axle 22 of the first embodiment to mount the unit including the main hub axle 20, the hub assembly 24 and the free wheel 26 to the frame mounting flanges 14 and 16 in the manner described above with respect to the first embodiment and as illustrated in FIGS. 1-13.

Parts of this sixth embodiment that are identical to parts of the first embodiment will be identified with same reference characters as the first embodiment for the sake of convenience. Parts of this sixth embodiment that are functionally identical (but not exactly identical) to parts of the first embodiment will be identified with the same reference characters but with "600" added thereto for the sake of convenience.

The shaft member 630 includes a modified outer axle 640 and a modified inner axle 642 that are attached together using a modified fixing structure to prevent axial removal of the inner axle 642 from the outer axle 640 and to prevent relative rotation between the inner axle 642 and the outer axle 640. The threaded connection 44 and the set screws 46 of the first embodiment have been eliminated in this sixth embodiment. Instead, in this sixth embodiment, the outer axle 640 includes a stepped internal through bore 640d that is unthreaded but includes a non-circular (e.g. square) engagement section 641. The inner axle 642 has a mating non-circular (e.g. square) engagement section 643 that is non-rotatably received in the engagement section 641 when the inner axle 642 is mounted in the internal bore 640d to prevent relative rotation between the inner axle 642 and the outer axle 640. The inner axle 642 further includes a threaded free end that has a nut 645 attached thereto to prevent axial removal of the inner axle 642 from the outer axle 640. The adjustment member 36 together with the modified fixing structure of this embodiment can be considered parts of a modified adjustment structure or adjustable fixing structure.

Seventh Embodiment

Referring now to FIGS. 20 and 21, a bicycle wheel securing structure or axle 722 having a modified shaft member 730 in accordance with a seventh embodiment of the present invention will now be explained. The wheel securing axle 722 of this seventh embodiment is identical to the wheel securing axle 22 of the first embodiment, except for the shaft member 730. Accordingly, this seventh embodiment will not be discussed and/or illustrated in detail herein, except as related to the shaft member 730. However, it will be apparent to those skilled in the bicycle art from this disclosure that the descriptions and illustrations of the first embodiment also apply to this seventh embodiment, except as explained and/or illustrated herein. Moreover, it will be apparent to those skilled in the bicycle art from this disclosure that the wheel securing axle 722 is designed to replace the wheel securing axle 22 of the first embodiment to mount the unit including the main hub axle 20, the hub assembly 24 and the free wheel 26 to the frame mounting flanges 14 and 16 in the manner described above with respect to the first embodiment and as illustrated in FIGS. 1-13.

Parts of this seventh embodiment that are identical to parts of the first embodiment will be identified with same reference characters as the first embodiment for the sake of convenience. Parts of this seventh embodiment that are functionally identical (but not exactly identical) to parts of the first embodiment will be identified with the same reference characters but with "700" added thereto for the sake of convenience.

The shaft member 730 includes a modified outer axle 740 and a modified inner axle 742 that are attached together using a modified fixing structure to prevent axial removal of the inner axle 742 from the outer axle 740 and to prevent relative rotation between the inner axle 742 and the outer axle 740. The threaded connection 44 and the set screws 46 of the first embodiment have been eliminated in this seventh embodiment. Instead, in this seventh embodiment, the outer axle 740 includes a stepped internal through bore 740d that is unthreaded but includes a non-circular (e.g. square) engagement section 741. The inner axle 742 has a mating non-circular (e.g. square) engagement section 743 that is non-rotatably received in the engagement section 741 when the inner axle 742 is mounted in the internal bore 740d to prevent relative rotation between the inner axle 742 and the outer axle 740. The inner axle 742 further includes a free end with an annular recess that has a retainer clip 745 attached thereto to prevent axial removal of the inner axle 742 from the outer axle 740. The adjustment member 36 together with the modified fixing structure of this embodiment can be considered parts of a modified adjustment structure or adjustable fixing structure.

Eighth Embodiment

Figure 23:
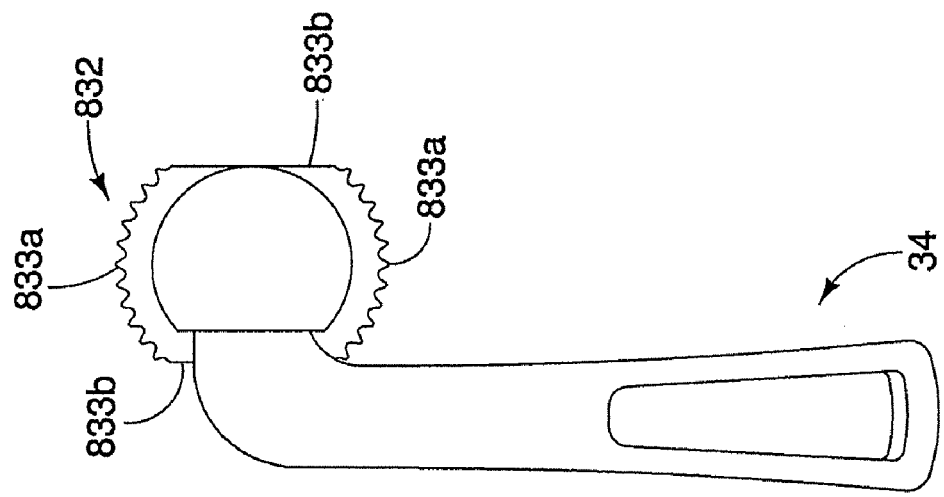
FIG. 23 is an end elevational view of the wheel securing axle illustrated in FIG. 22.
Figure 22:
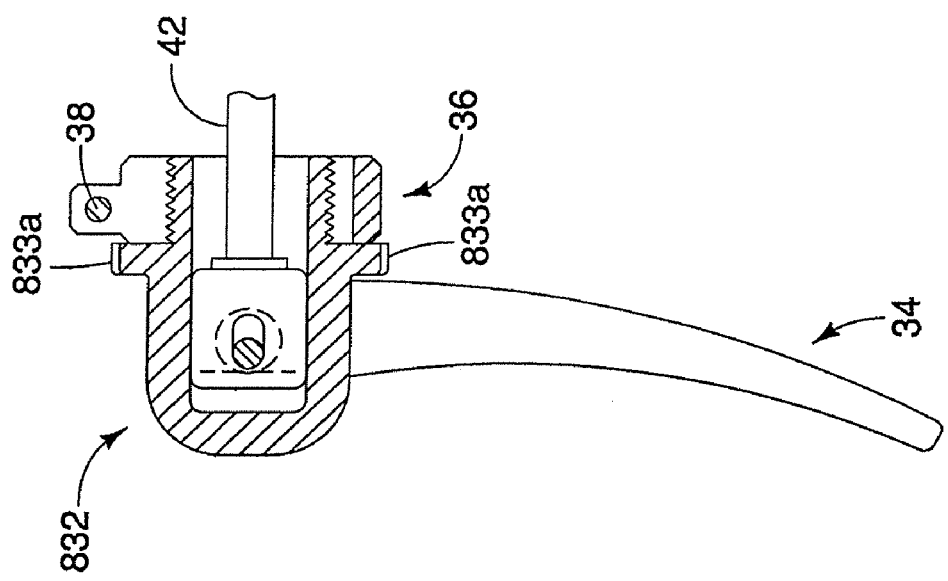
FIG. 22 is an enlarged, partial cross-sectional view of a wheel securing axle in accordance with an eighth embodiment.
Figure 24:
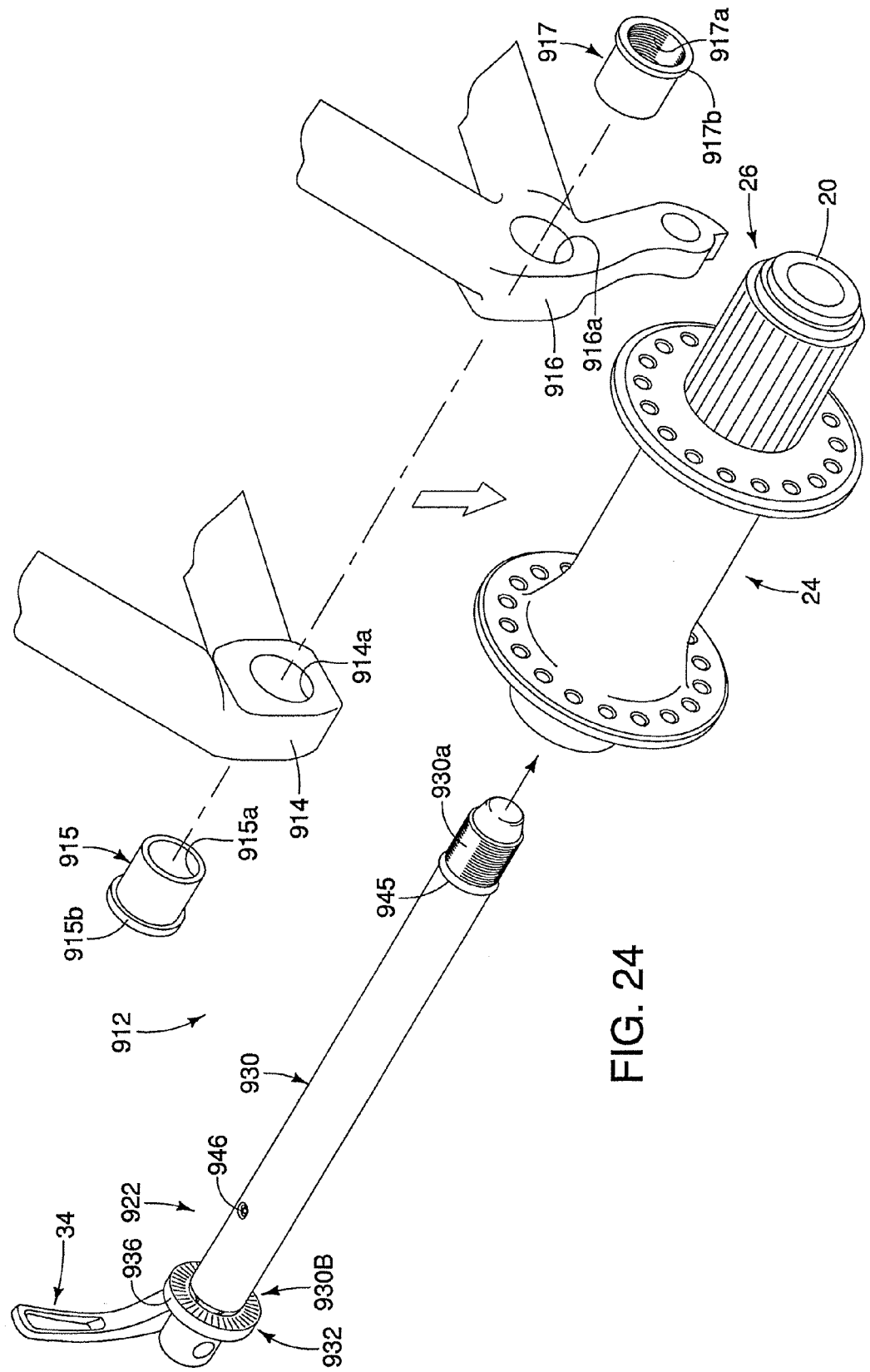
FIG. 24 is an enlarged, exploded perspective view of a portion of a frame and a rear hub in accordance with a ninth embodiment.
Figure 25:
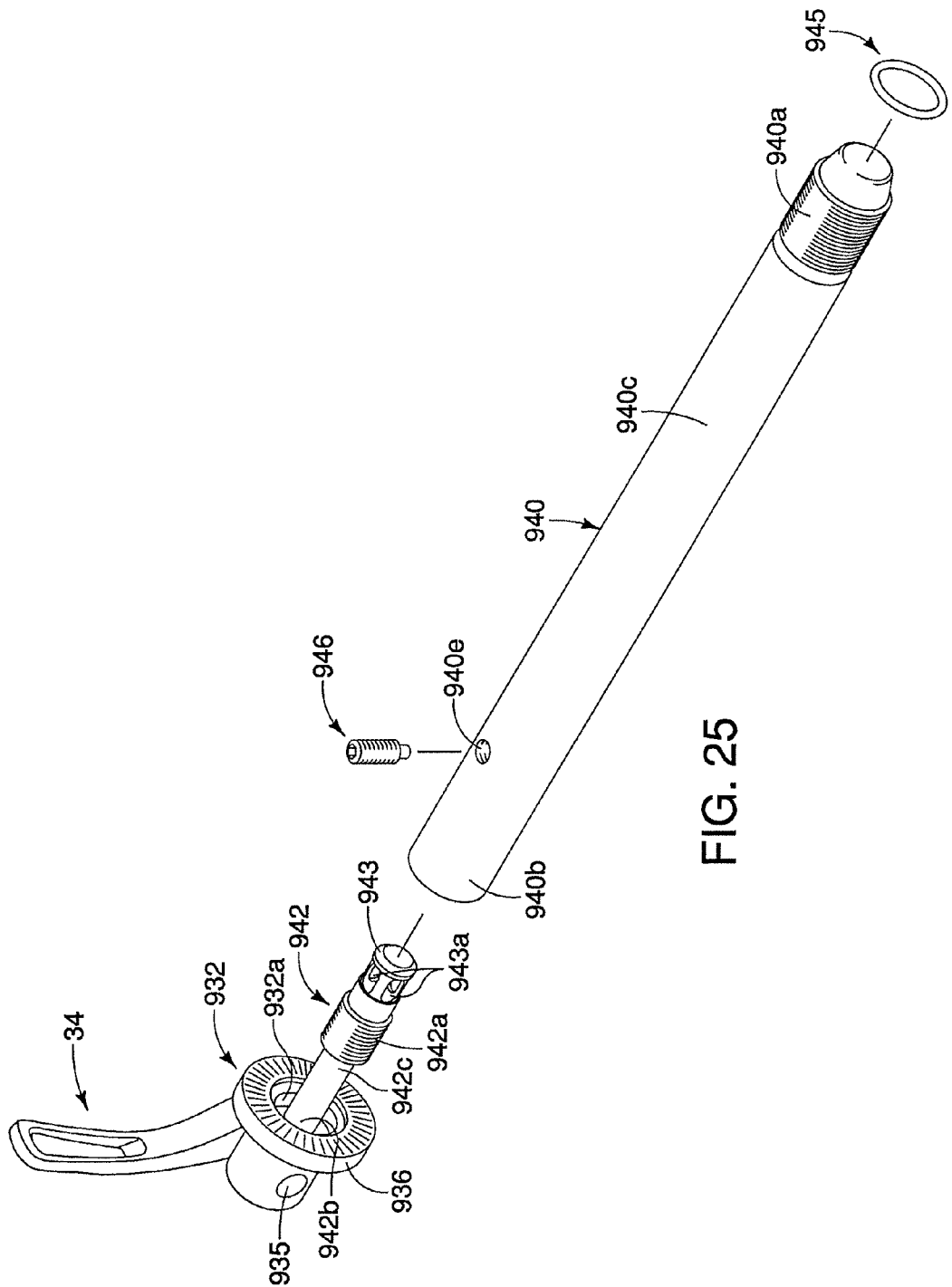
FIG. 25 is an exploded, perspective view of the wheel securing axle of the rear hub illustrated in FIG. 24.
Figure 26:
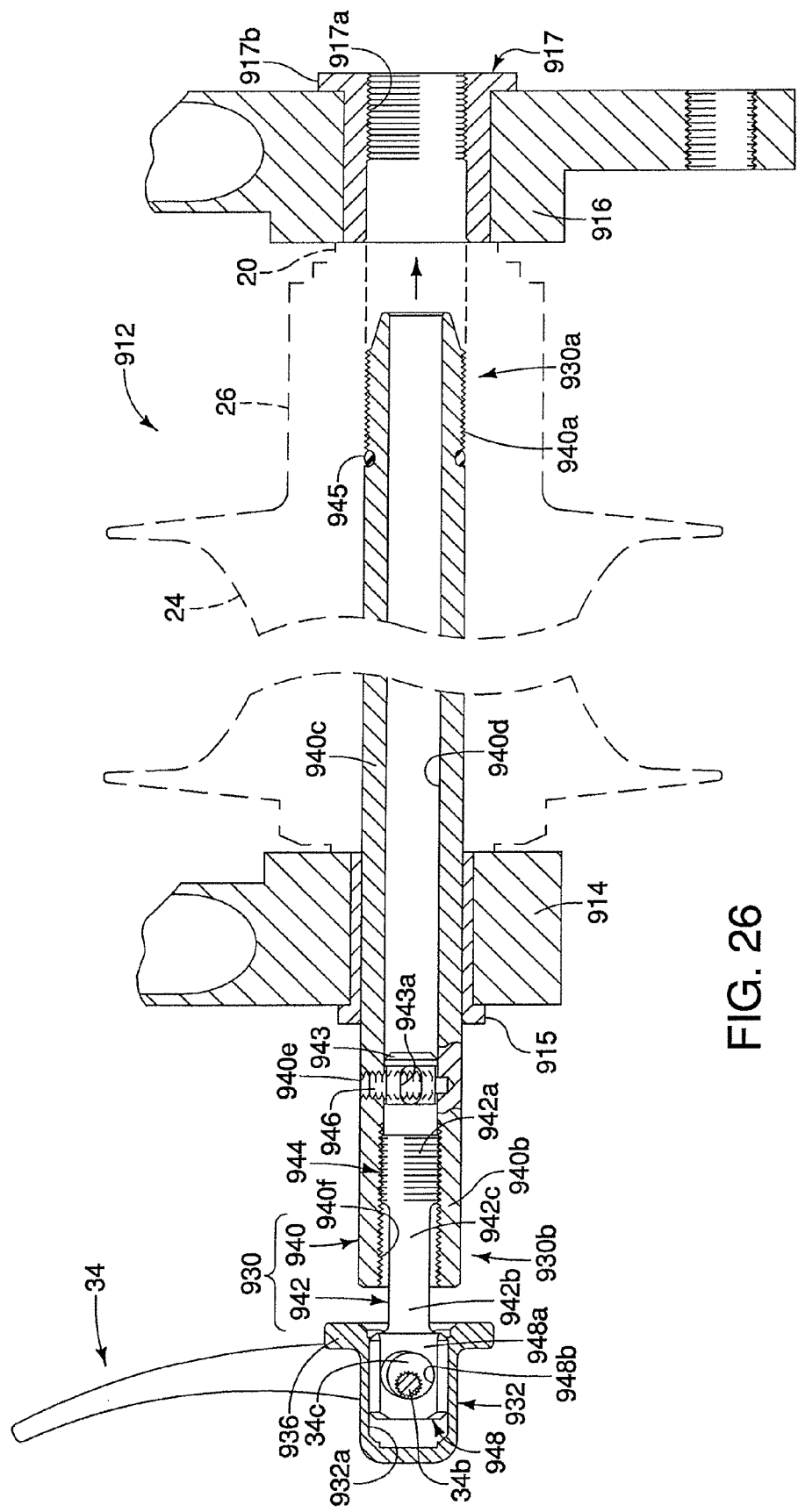
FIG. 26 is an enlarged, partial cross-sectional view of the portion of the frame and the rear hub illustrated in FIG. 24, with the wheel securing axle in a first, partially installed position.
Figure 27:
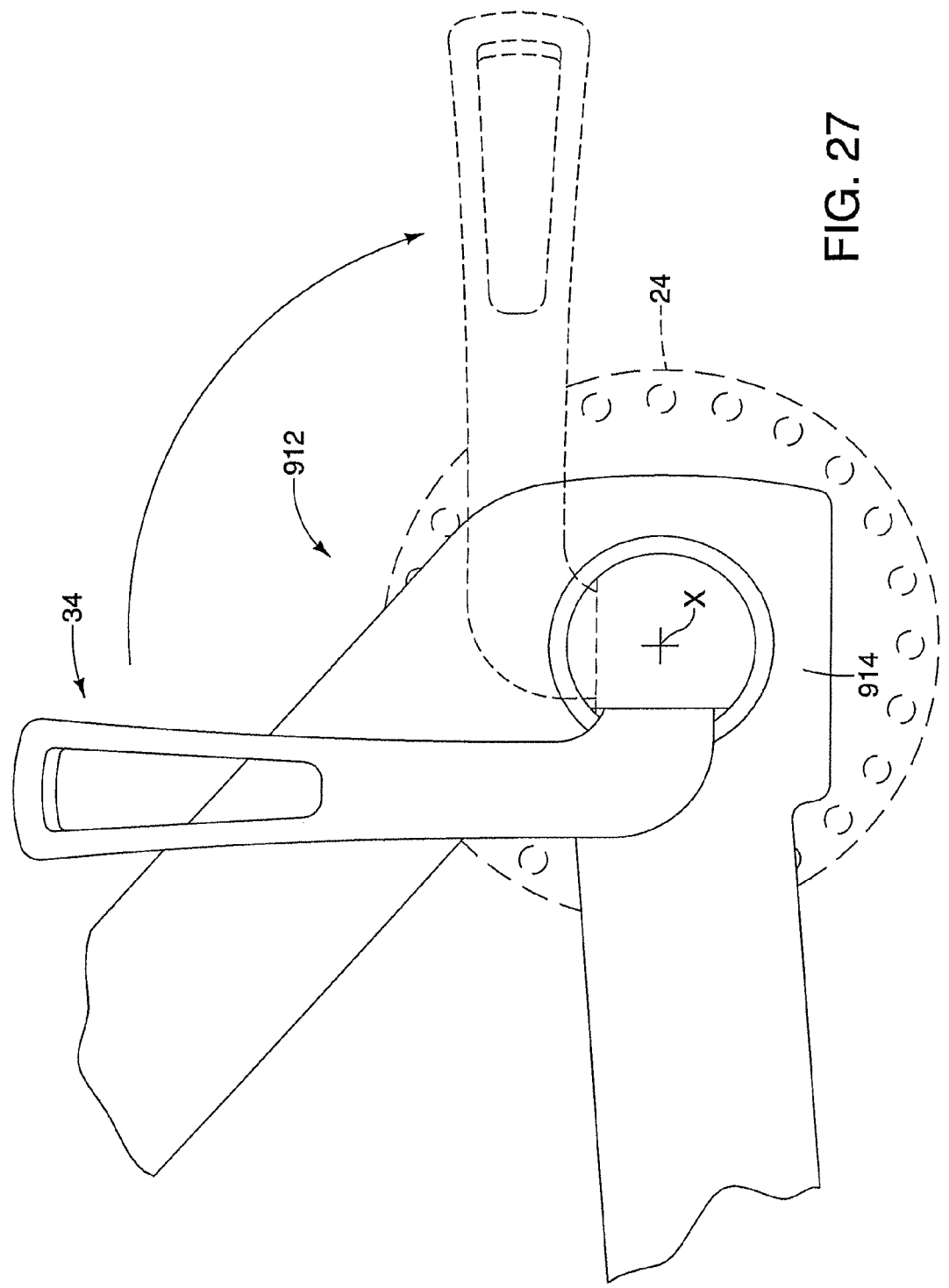
FIG. 27 is an enlarged, end elevational view of the portion of the frame and the rear hub illustrated in FIG. 26, illustrating rotation of the wheel securing axle from the first, partially installed position.
Figure 28:
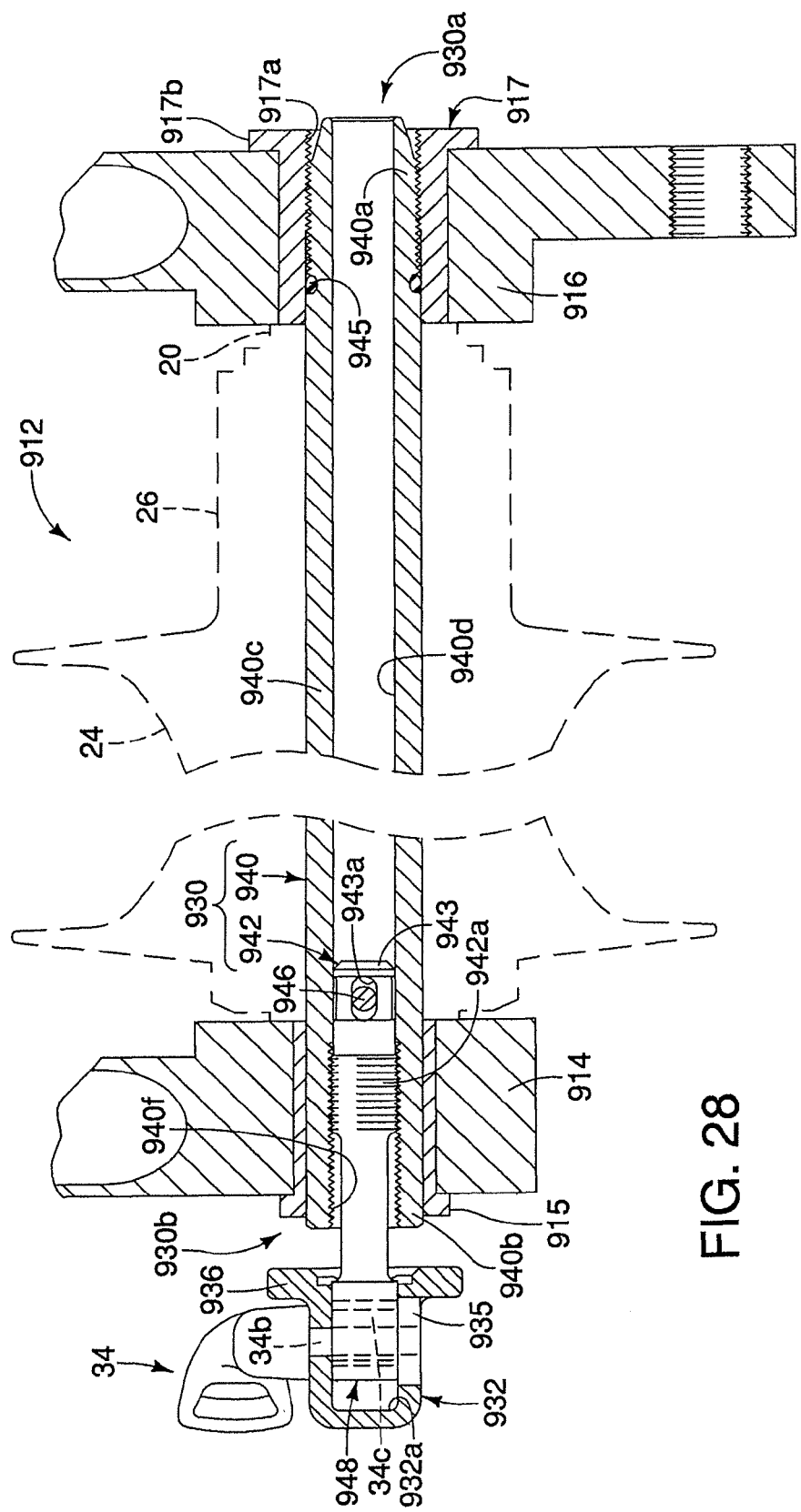
FIG. 28 is an enlarged, partial cross-sectional view of a portion of the frame and the rear hub illustrated in FIG. 24, with the wheel securing axle in a second, partially installed position (i.e. during rotation as illustrated in FIG. 27)
Figure 29:
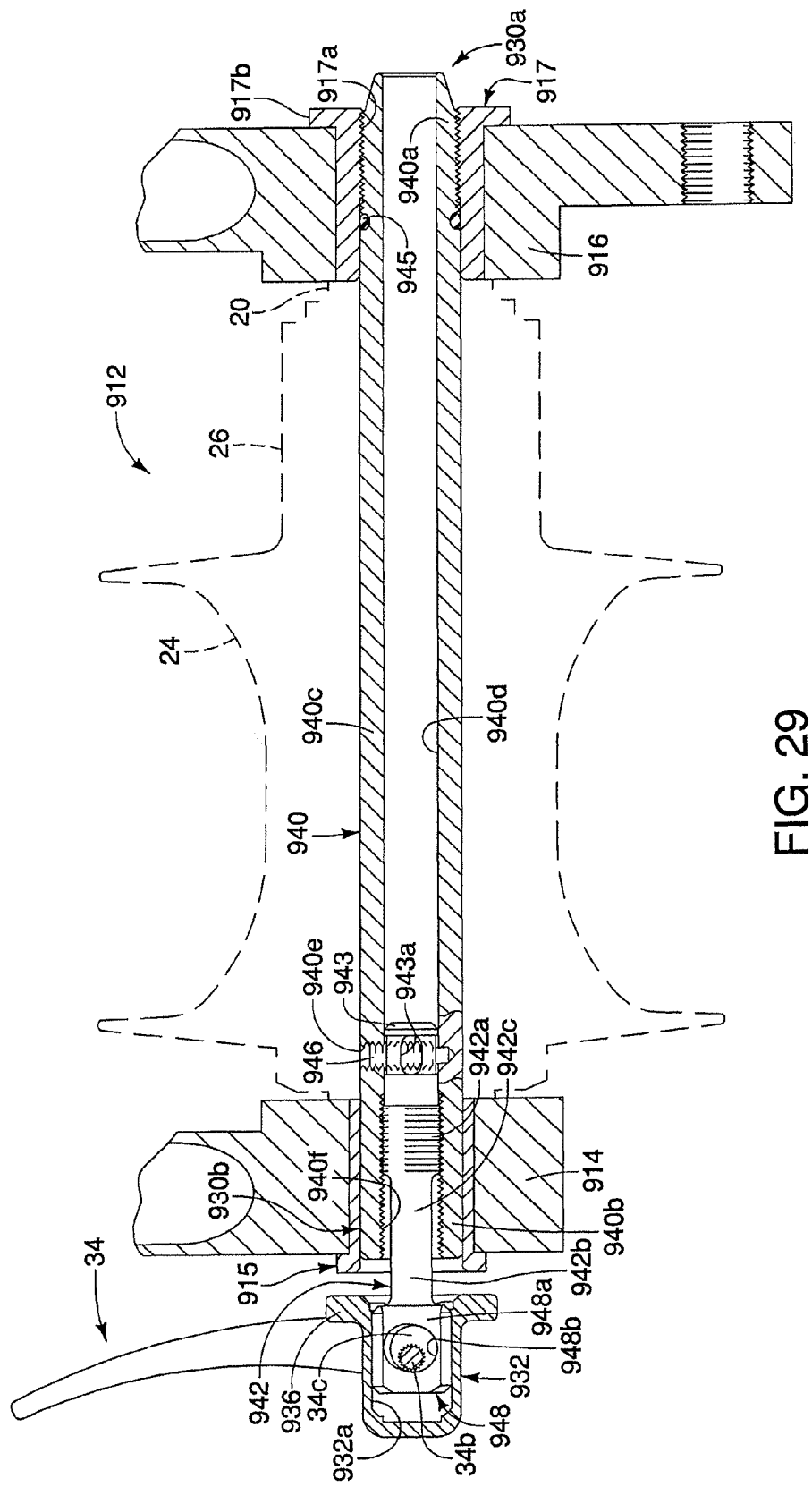
FIG. 29 is an enlarged, partial cross-sectional view of a portion of the frame and the rear hub illustrated in FIG. 24, with the wheel securing axle in a third, partially installed position (i.e. after rotation as illustrated in FIGS. 27 and 28) but prior to clamping the frame using the wheel securing lever.
Figure 30:
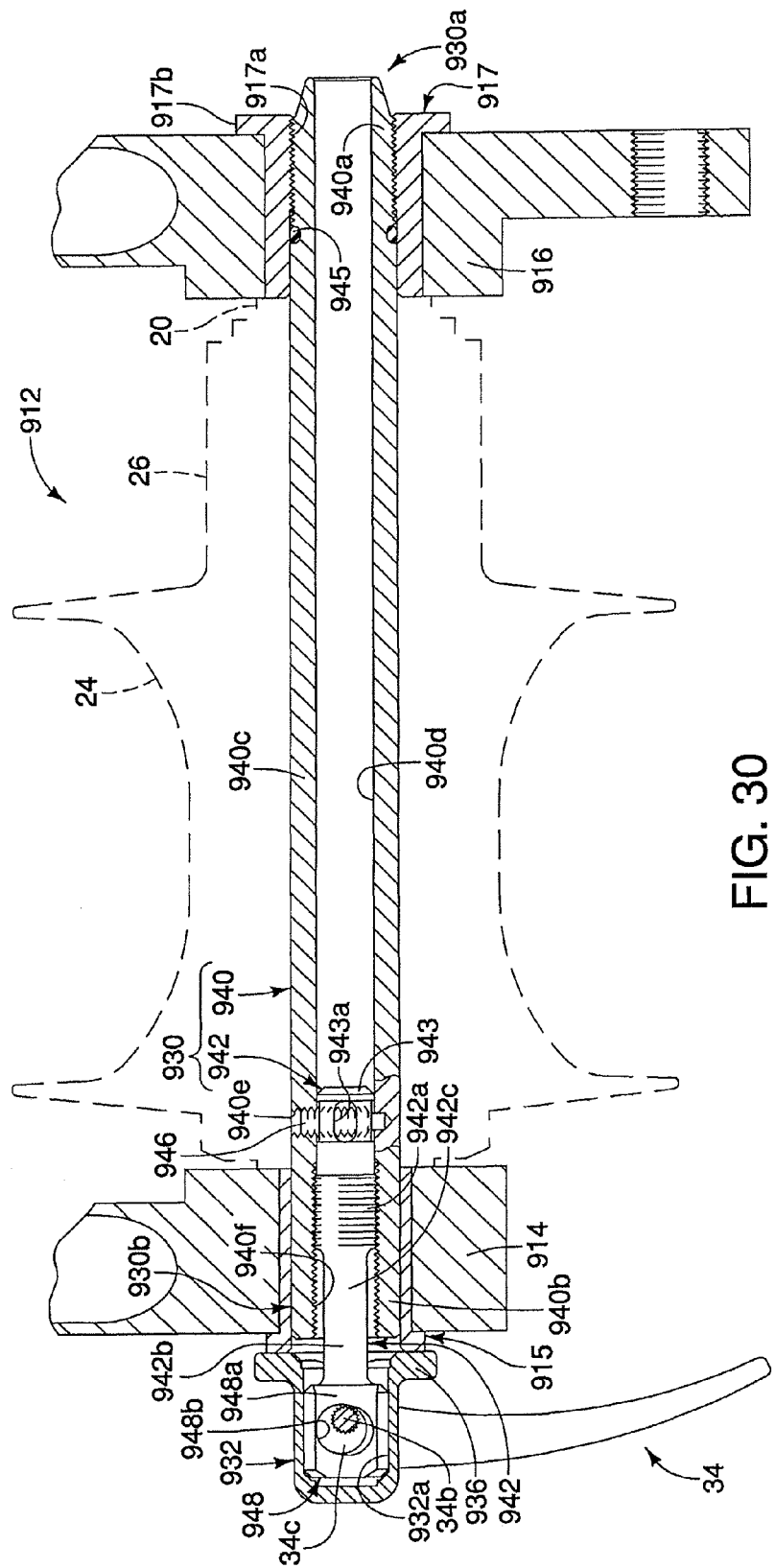
FIG. 30 is an enlarged, partial cross-sectional view of a portion of the frame and the rear hub illustrated in FIG. 24, with the wheel securing axle in a fully installed position after clamping the frame using the wheel securing lever.
Figure 37:
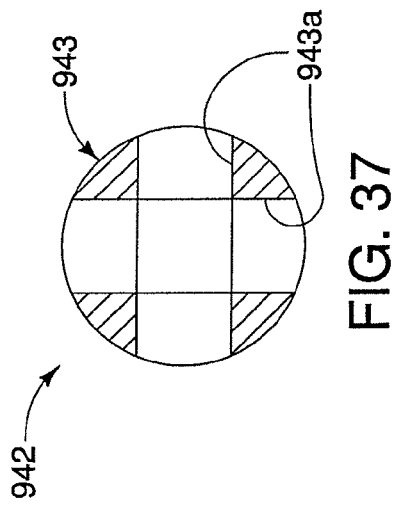
FIG. 37 is a cross-sectional view of the inner axle illustrated in FIGS. 34-36, as seen along section line 37-37 of FIG. 35
Figure 35:
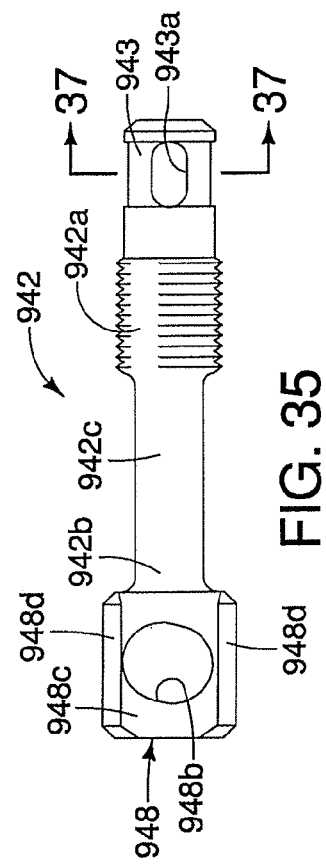
FIG. 35 is a longitudinal elevational view of the inner axle illustrated in FIG. 34.
Figure 34:
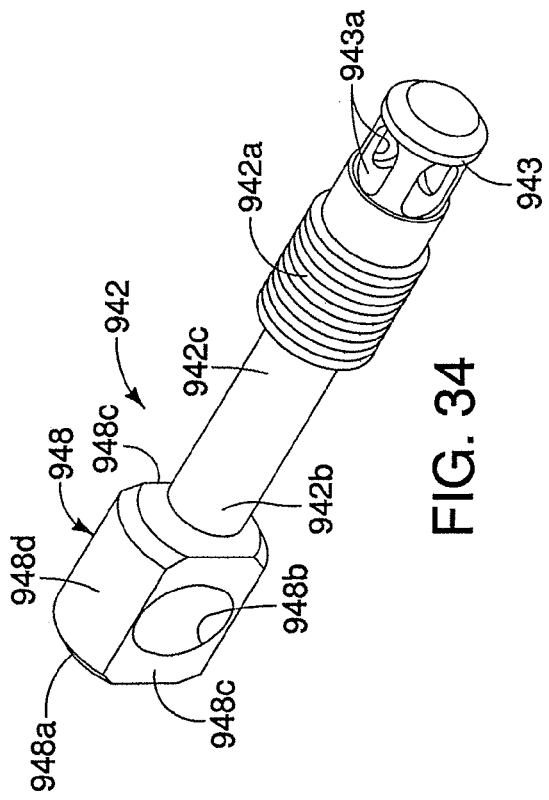
FIG. 34 is an enlarged perspective view of the inner axle of the wheel securing axle illustrated in FIGS. 24-31.
Figure 36:
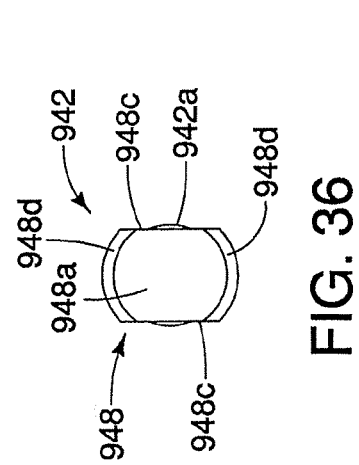
FIG. 36 is an end elevational view of the inner axle illustrated in FIGS. 34 and 35.
Figure 38:
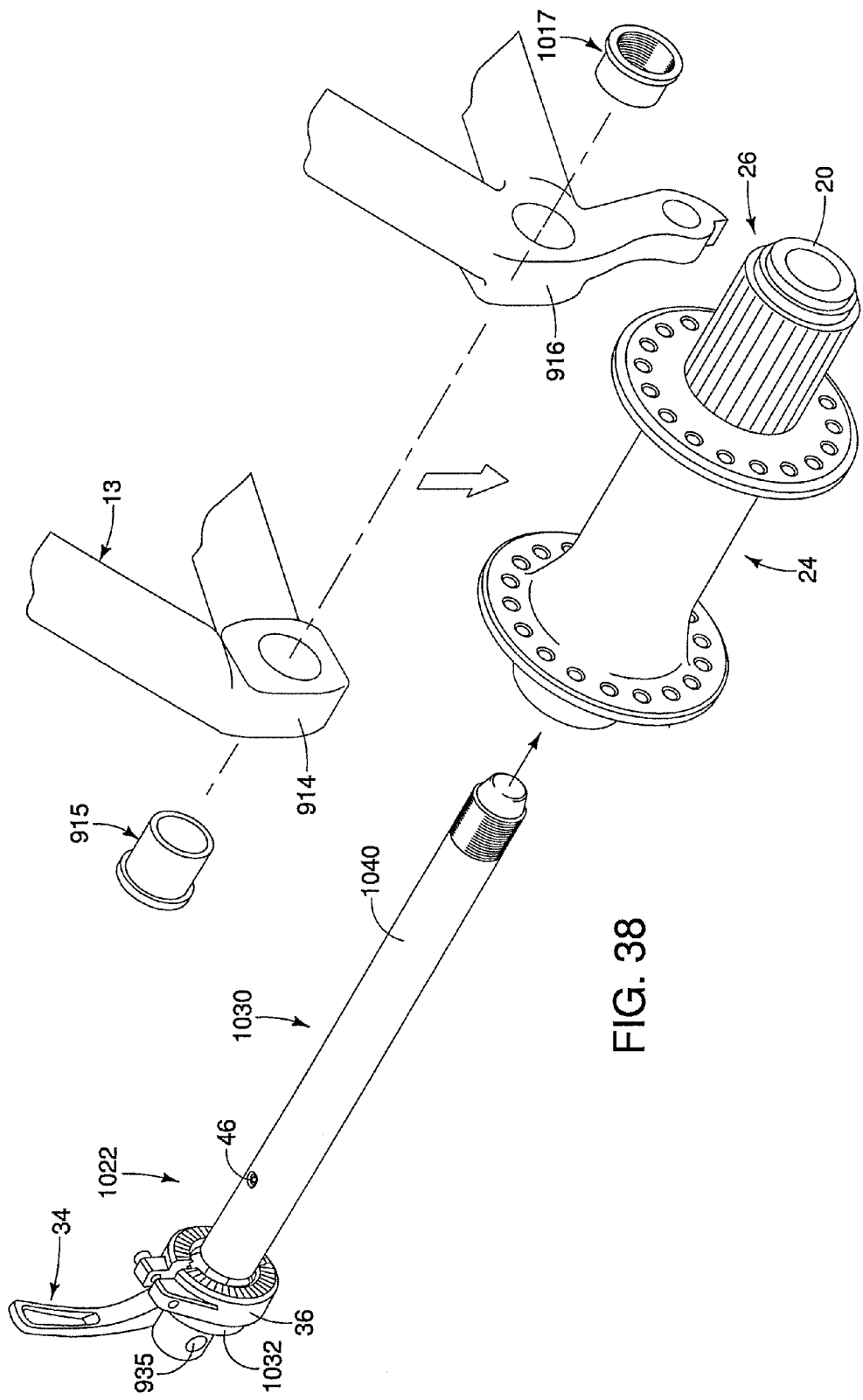
FIG. 38 is an enlarged, exploded perspective view of a portion of a frame and a rear hub in accordance with a tenth embodiment.
Figure 39:
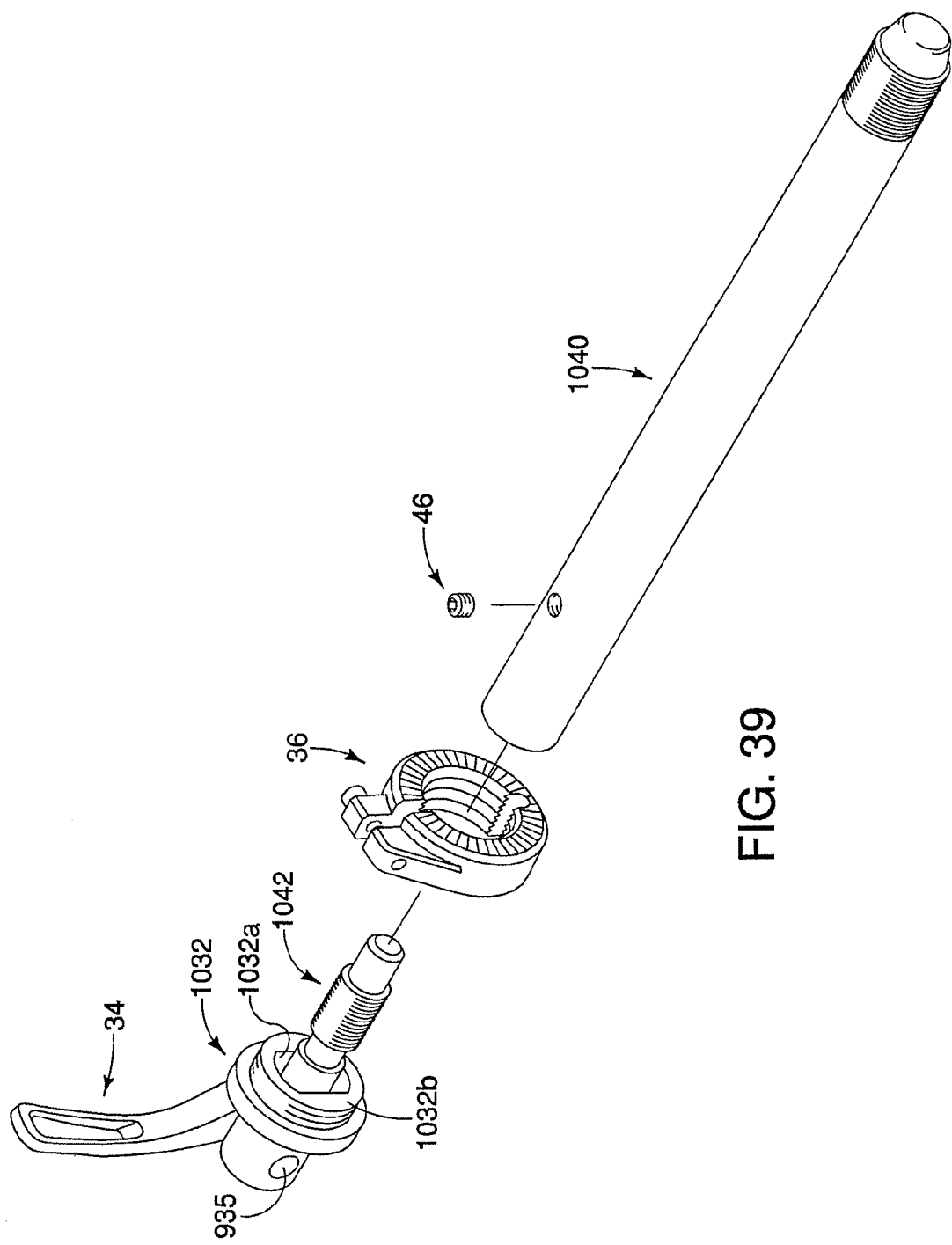
FIG. 39 is an exploded, perspective view of the wheel securing axle of the rear hub illustrated in FIG. 38.
Figure 40:
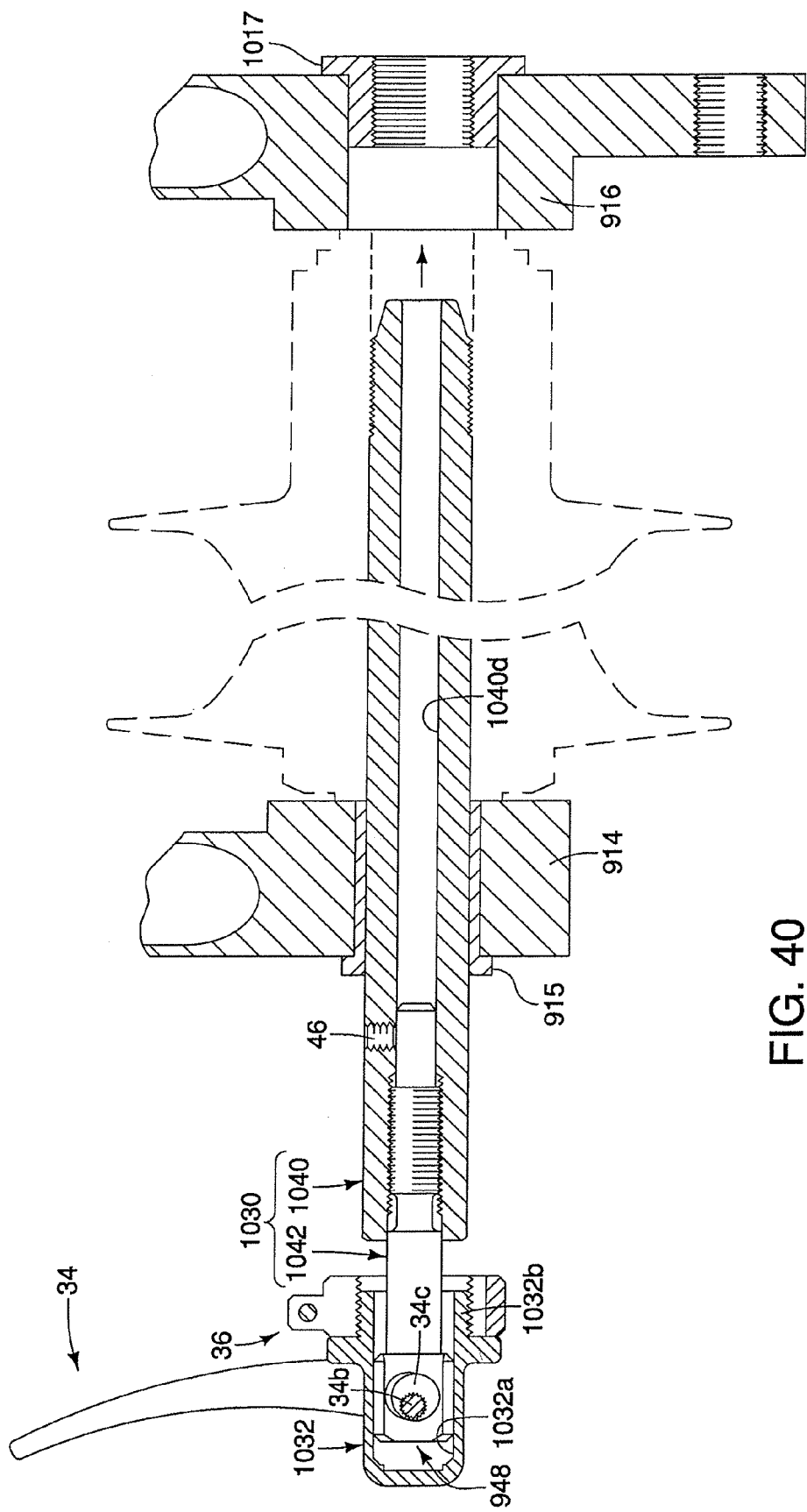
FIG. 40 is an enlarged, partial cross-sectional view of the portion of the frame and the rear hub illustrated in FIG. 38, with the wheel securing axle in a first, partially installed position.
Figure 41:
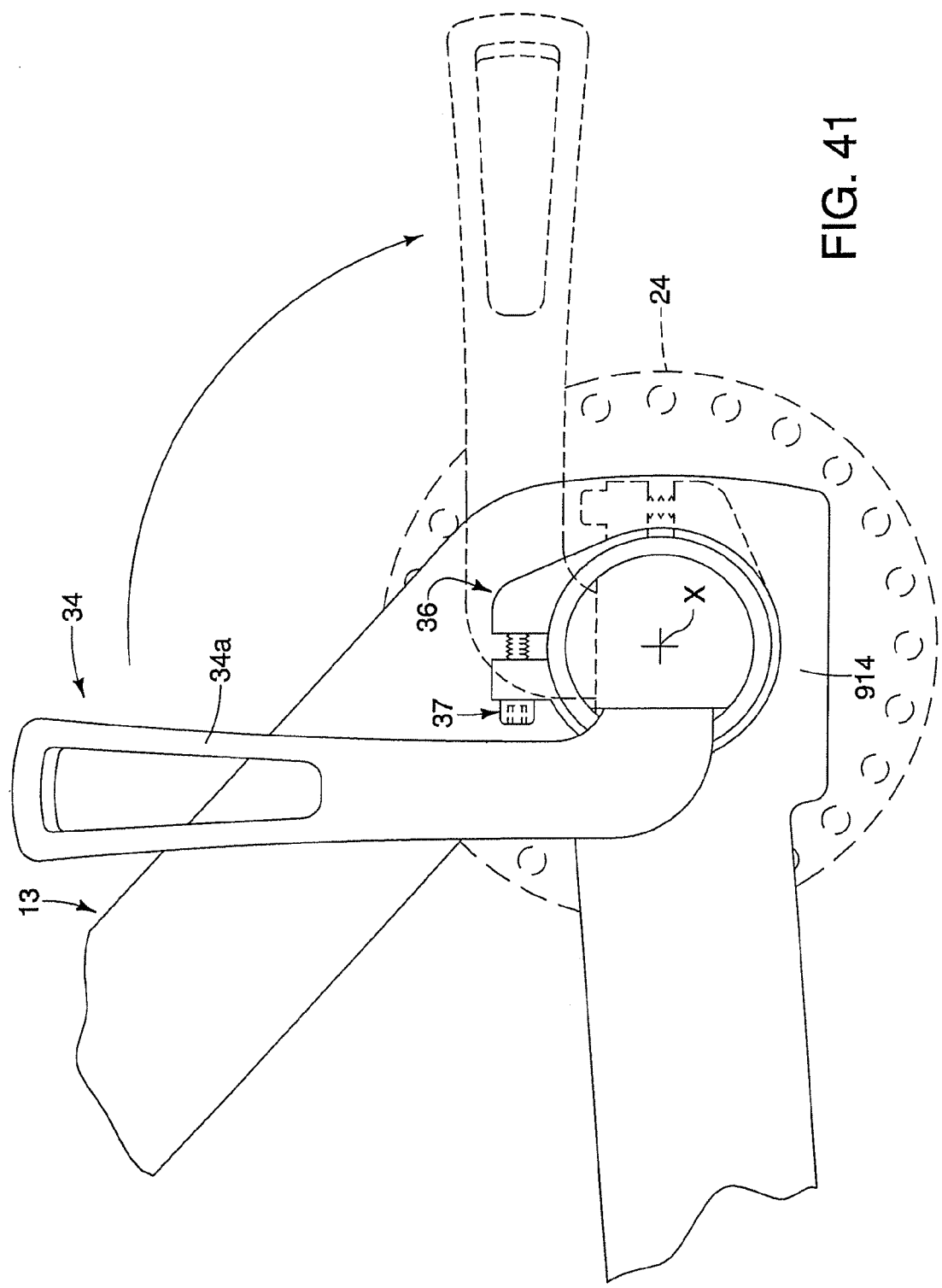
FIG. 41 is an enlarged, end elevational view of the portion of the frame and the rear hub illustrated in FIG. 40, illustrating rotation of the wheel securing axle from the first, partially installed position.
Figure 42:
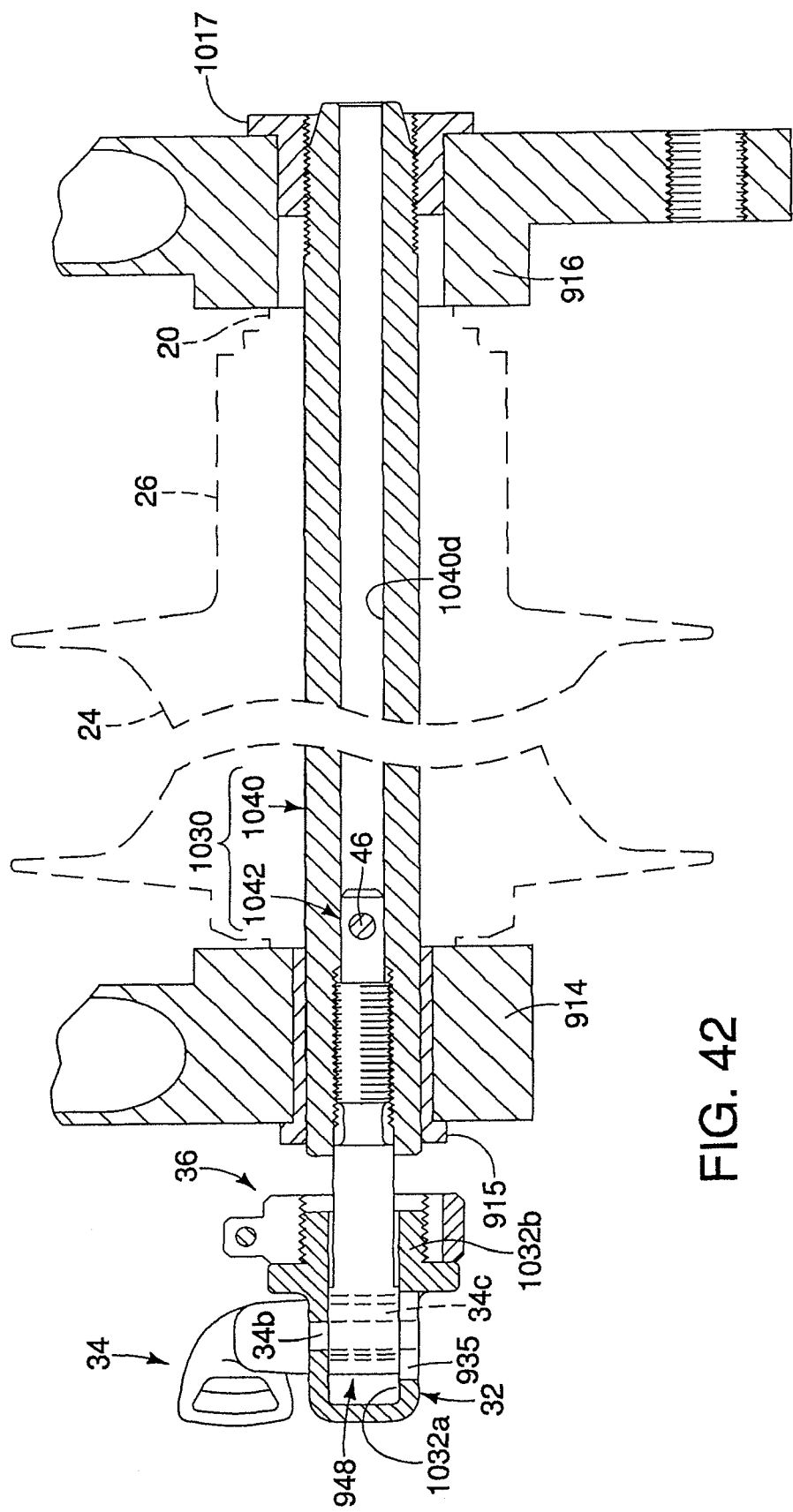
FIG. 42 is an enlarged, partial cross-sectional view of a portion of the frame and the rear hub illustrated in FIG. 38, with the wheel securing axle in a second, partially installed position (i.e. during rotation as illustrated in FIG. 41)
Figure 43:
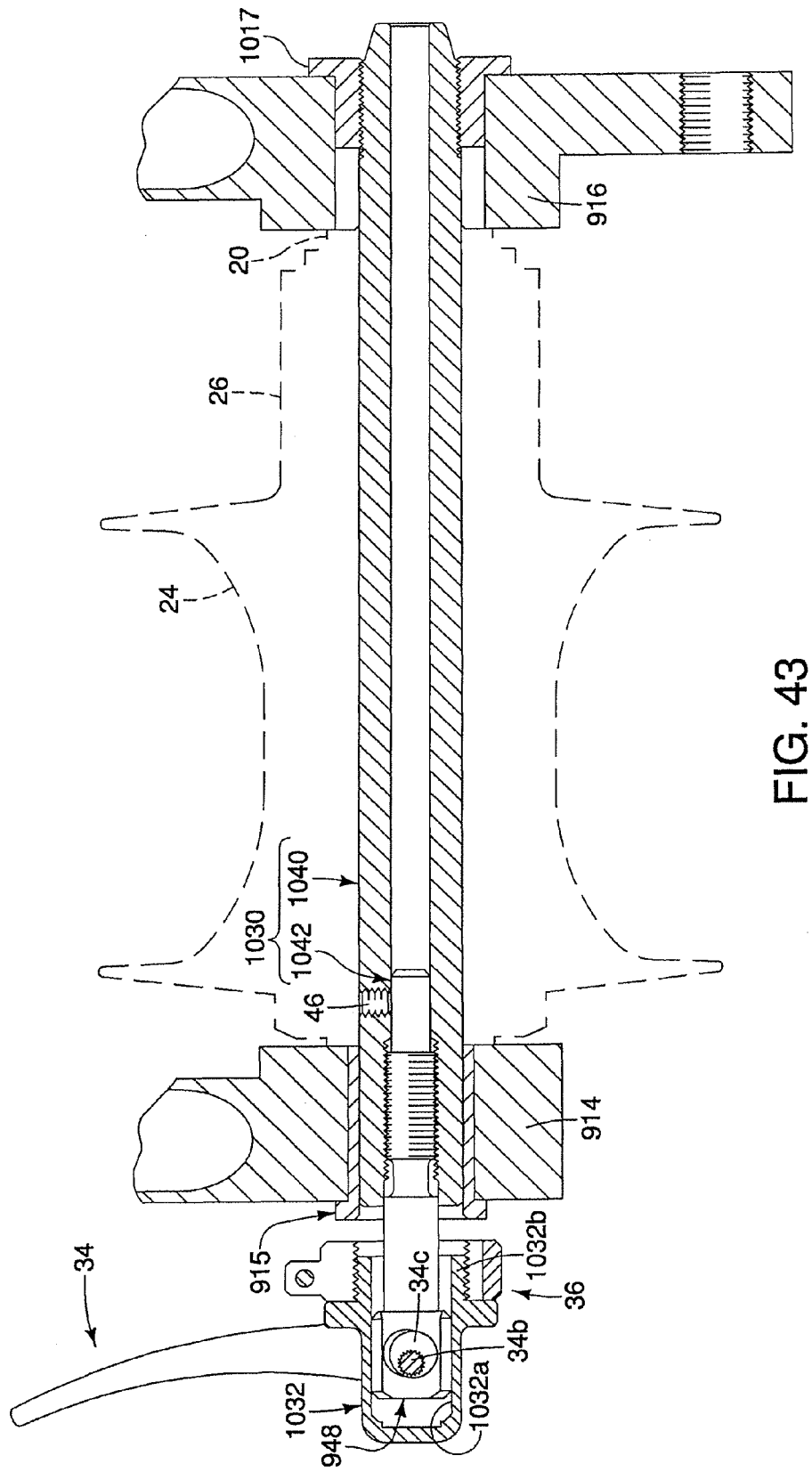
FIG. 43 is an enlarged, partial cross-sectional view of a portion of the frame and the rear hub illustrated in FIG. 38, with the wheel securing axle in a third, partially installed position (i.e. after rotation as illustrated in FIGS. 41 and 42) but prior to clamping the frame using the wheel securing lever.
Figure 44:
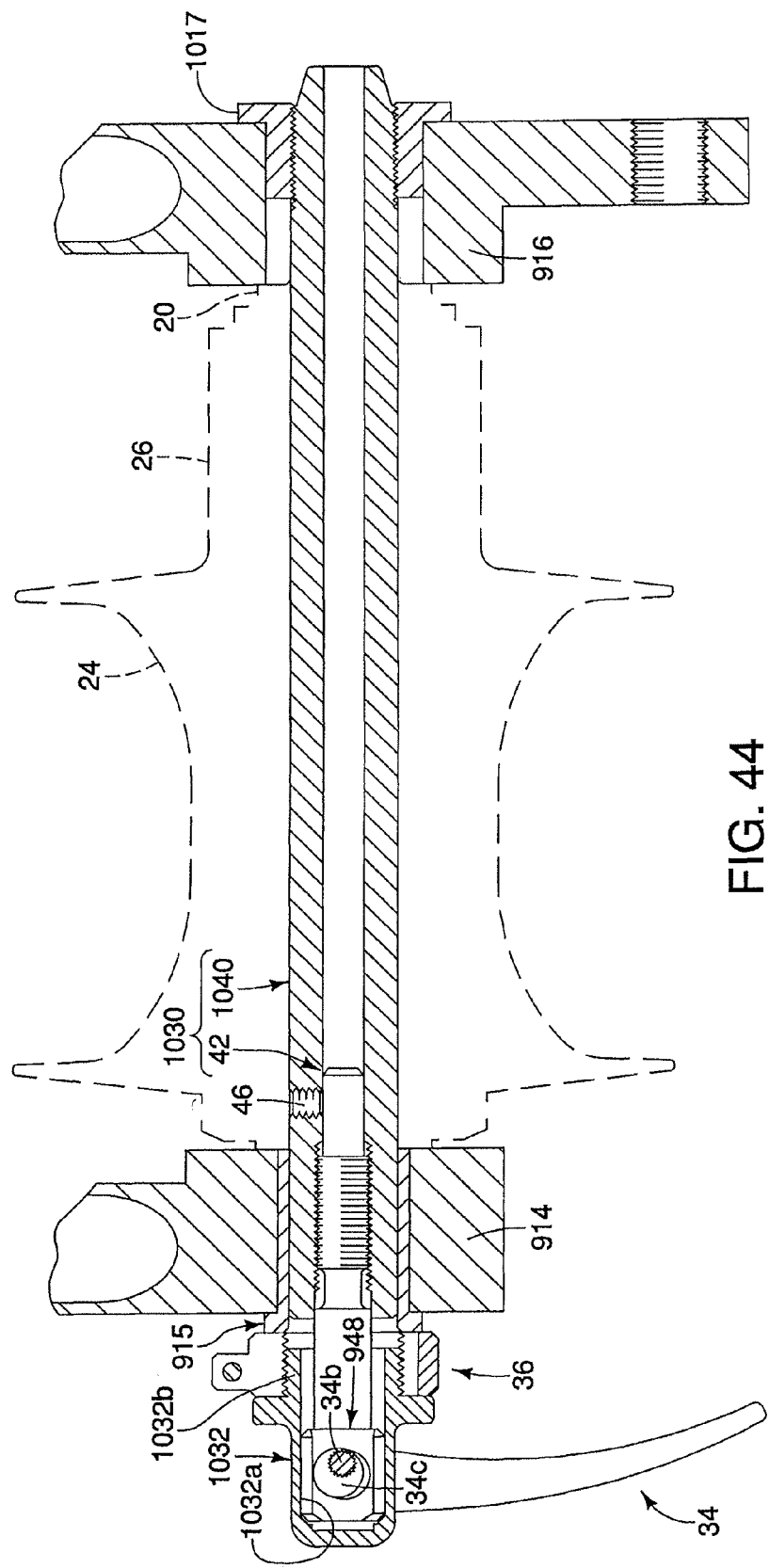
FIG. 44 is an enlarged, partial cross-sectional view of a portion of the frame and the rear hub illustrated in FIG. 38, with the wheel securing axle in a fully installed position after clamping the frame using the wheel securing lever.

Referring now to FIGS. 22 and 23, a portion of a bicycle wheel securing structure or axle having a modified head member 832 in accordance with an eighth embodiment of the present invention will now be explained. This eighth embodiment is identical to the first embodiment, except for the head member 832. Accordingly, this eighth embodiment will not be discussed and/or illustrated in detail herein, except as related to the head member 832. However, it will be apparent to those skilled in the bicycle art from this disclosure that the descriptions and illustrations of the first embodiment also apply to this second embodiment, except as explained and/or illustrated herein. Moreover, it will be apparent to those skilled in the bicycle art from this disclosure that the head member 832 is designed to replace the head member 32 of the first embodiment to mount the unit including the main hub axle 20, the hub assembly 24 and the free wheel 26 to the frame mounting flanges 14 and 16 in the manner described above with respect to the first embodiment and as illustrated in FIGS. 1-13.

Parts of this eighth embodiment that are identical to parts of the first embodiment will be identified with same reference characters as the first embodiment for the sake of convenience. Parts of this eighth embodiment that are functionally identical (but not exactly identical) to parts of the first embodiment will be identified with the same reference characters but with "800" added thereto for the sake of convenience.

The head member 832 of this eighth embodiment is identical to the head member 32 of the first embodiment, except the head member 832 includes an engagement section with one or more textured gripping areas 833a and/or one or more (e.g. flat) tool engagement surfaces 833b to facilitate rotation of the head member 832. It will be apparent to those skilled in the bicycle art from this disclosure that a continuous annular textured gripping area can be provided (i.e., the tool engagement surfaces 833b can be omitted) or additional tool engagement surfaces 833b can be provided (i.e., the gripping areas 833a can be omitted) if needed and/or desired. Also, it will be apparent to those skilled in the bicycle art from this disclosure that the features of this embodiment can be applied to any of the other embodiments illustrated herein.

Ninth Embodiment

Referring now to FIGS. 24-37, mounting a modified rear hub 912 with a modified bicycle wheel securing structure or axle 922 to a pair of modified mounting flanges 914 and 916 in accordance with a ninth embodiment of the present invention will now be explained. The rear hub 912 is identical to the rear hub 12 of the first embodiment, except for the modified wheel securing axle 922, as explained below. The mounting flanges 914 and 916 are identical to the mounting flanges 14 and 16 of the first embodiment, except the mounting flanges 914 and 916 include enlarged unthreaded openings 914a and 916a with adapters 915 and 917 received therein, respectively. In view of the similarity between this ninth embodiment and the first embodiment, this ninth embodiment will not be discussed and/or illustrated in detail herein, except as related to the modified wheel securing axle 922, and the modified mounting flanges 914 and 916 having the adapters 915 and 917. However, it will be apparent to those skilled in the bicycle art from this disclosure that the descriptions and illustrations of the first embodiment also apply to this ninth embodiment, except as explained and/or illustrated herein. Moreover, it will be apparent to those skilled in the bicycle art from this disclosure that mounting flanges 914 and 916 with the adapters 317 is designed to replace the mounting flanges 14 and 16 of the first embodiment to mount parts of the rear hub 912 (i.e., the unit including the main hub axle 20, the hub assembly 24 and the free wheel 26) to the frame 11 using the wheel securing axle 922.

Parts of this ninth embodiment that are identical to parts of the first embodiment will be identified with same reference characters as the first embodiment for the sake of convenience. Parts of this ninth embodiment that are functionally identical (but not exactly identical) to parts of the first embodiment will be identified with the same reference characters but with "900" added thereto for the sake of convenience.

The adapter 915 is mounted in the hole 914a of the mounting flange 914. The adapter 915 has in internal unthreaded bore 915a to freely rotatably receive part of the wheel securing axle 922 and an annular flange 915b, which abuts against an outside surface of the mounting flange 914. The adapter 917 is mounted in the hole 916a of the mounting flange 916. The adapter 917 has in internal (female) threaded bore 917a to threadedly receive part of the wheel securing axle 922 and an annular flange 917b, which abuts against an outside surface of the mounting flange 916. The adapters 915 and 917 can be slidably mounted within the holes 914a and 916a, respectively. Alternatively, the adapters 915 and 917 can be non-rotatably mounted in the holes 914a and 916a via a press-fit or the like. Of course, it will be apparent to those skilled in the bicycle art from this disclosure that other types of non-rotational and non-axially movable connections between the adapters 915 and 917 and the holes 914a and 916a are possible if needed and/or desired. Also, it will be apparent to those skilled in the bicycle art from this disclosure that the features of the flanges 914 and 916 and the adapters 915 and 917 of this embodiment can be applied to any of the other embodiments illustrated herein.

The modified wheel securing axle 922 includes a modified shaft member 930, a modified head member 932 and a lever member 34. The adjustment member 36 of the preceding embodiments has been eliminated in this ninth embodiment. Due to the elimination of the adjustment member 36 in this ninth embodiment, the modified head member 932 and the lever member 34 do not project axially as far away from the mounting flange 914 as the preceding embodiments. The shaft member 930 has a first threaded end 930a and a second end 930b.

The first threaded end 930a is designed to be directly threadedly attached to the adapter 917 mounted to the mounting flange 916. The second end 930b supports the head member 932. The lever member 34 is operatively mounted between the shaft member 930 and the head member 932 to move the shaft member 930 in an axial direction relative to the head member 932 in response to movement of the lever member 34. The second end 930b is supported in the adapter 915.

The shaft member 930 basically includes an outer axle 940 and an inner axle 942 releasably attached within the outer axle 940 in an installed position, as seen in FIGS. 26 and 28-30. The outer axle 940 and the inner axle 942 are preferably releasably attached together via a threaded connection 944 to releasably prevent axial removal of the inner axle 942 from the outer axle 940 when the inner axle 942 is in the installed position. A set screw 946 is releasably coupled between the outer axle 940 and the inner axle 942 to prevent relative rotation therebetween.

Referring to FIGS. 24-26, 28-30 and 32, the outer axle 940 basically includes a first externally threaded end 940a, a second end 940b, an outer rod portion 940c, an internal bore 940d and a transverse, partially threaded bore 940e. The threaded end 940a is preferably threadedly attached to the mounting flange 916 using the adapter 917. The second end 940b is attached to the mounting flange 914 using the adapter 915. The outer rod portion 940c extends between the first and second ends 940a and 940b. The outer axle 940 is preferably tightened so as not to project axially from the adapter 915. An O-ring 945 is preferably mounted in a mating groove of the first end 940a. The O-ring 945 is preferably constructed of an elastomeric material such as rubber, and engages the adapter 917 to prevent undesired rotation (accidental loosening) of the outer axle 940. It will be apparent to those skilled in the art from this disclosure that O-ring can be utilized in any of the embodiments disclosed herein. Either a mating groove should be provided in the shaft (like this embodiment) or a thinner O-ring may be mounted directly on the threads.

In this embodiment, the internal bore 940d is a through bore having a substantially constant diameter and a threaded section 940f arranged at the second end 940b of the outer axle 940 at an open end at the second end 940b. The inner axle 942 is threadedly attached to the threaded section 940f of the internal bore 940d. The inner axle 942 extends out of the internal bore 940d. Thus, the inner axle 942 extends axially outwardly from the second end 40b of the outer axle 40 when the inner axle 42 is in the installed position. The head member 932 is preferably attached to an end of the inner axle 942 extending out of the internal bore 940d, in the manner described above with respect to the first embodiment.

The set screw 946 is a stepped member with an unthreaded section 946a and a threaded section 946b. The threaded section 946b is preferably threadedly mounted in the transverse bore 940e to releasably prevent relative rotation of the inner axle 942 within the internal bore 940d when the inner axle 942 is in the installed position. Specifically, in this embodiment, the set screw preferably extends through the inner axle 942 such that the unthreaded section 946a is received in a mating unthreaded section of the transverse bore 940e, when the set screw 946 is fully installed. The transverse bore 940e preferably includes a threaded section that extends between an external surface of the outer axle 940 and the internal bore 940d, and an unthreaded section extending from the internal bore 940d that is aligned with the threaded section.

Referring to FIGS. 24-36, 28-31 and 34-37, the inner axle 942 basically includes a first engagement end 943, a (first) threaded section 942a, a second end 942b, an inner rod portion 942c and a bracket 948. The first threaded section 942a is threadedly attached to the threaded section 940f of the internal bore 940d. The first threaded end 942a and the threaded section 940f constitute parts of the threaded connection 944 when coupled together. The second end 942b extends out of the internal bore 940d. The second end 942b supports the head member 932 and the lever member 34. Specifically, the second end 942b of the inner axle 42 has the bracket 948 attached thereto, which supports the head member 932 and the lever member 34.

The first engagement end 943 has a cylindrical shape with a pair of perpendicularly arranged slots 943a extending therethrough to form a plurality (four) adjustment openings that are circumferentially equally spaced apart from each other. In other words, the slots 943a are arranged to selectively removably receive the set screw in a plurality (four) of different rotational positions. In this embodiment, the set screw 946 extends through one of the slots 943a (i.e. into one of the adjustment openings) to prevent rotation of the inner axle 942 relative to the outer axle 940. Thus, the inner axle 942 includes at least one adjustment opening (slots 943a) that removably receives a portion of the set screw 946. Thus, the transverse bores 943a can act as part of an indexing structure together with the set screw 946.

The inner axle 942 is preferably constructed of a lightweight rigid material such as a metallic material utilizing conventional manufacturing techniques such as casting and/or machining. In this embodiment, the inner axle 942 can constructed as a one-piece, unitary member together with the bracket 948, or the bracket 948 can be constructed as a separate member that is fixed to the inner axle 942 (e.g. by welding or the like). In this embodiment, the inner axle 942 is preferably constructed of an iron alloy such as chrome-moly steel, while the outer axle 940 is preferably constructed of an aluminum alloy. In other words, the material of the outer axle 940 preferably has a lower specific gravity than the material of the inner axle 942. It will be apparent to those skilled in the art from this disclosure that this feature (materials of the inner and outer axles) of this ninth embodiment can be applied to any of the other embodiment disclosed herein. Also, in this embodiment, the outer axle 940 preferably has an outer maximum axial length, and the inner axle 942 preferably has an inner maximum axial length less than one-half of the outer maximum axial length of the outer axle 940. The length of inner axle 942 received in the internal bore 940*d* is preferably less than one-third of the maximum outer axial length of the outer axle 940.

The bracket 948 preferably has a block configuration with a support portion 948*a* having an eccentric cam opening 948*b* formed therein. The eccentric cam opening 948*b* extends between two flat sides 948*c*, while a pair of curved sides 948*d* connects the flat sides. The cam portion 34*c* of the lever member 34 is received in the eccentric cam opening 948*b*. An enlarged cap member 935 is mounted on the tip of the pivot pin portion 34*b* to retain the pivot pin portion 34*b* and the cam portion 34*c* of the lever member 34 within the head member 932. In other words, the lever member 34 is preferably identical to the first embodiment, except it includes the cap member 935, and the cam portion 34*c* may have a slightly modified shape in order to cooperate with the eccentric cam opening 948*b*. In any case, the bracket 948 cooperates with the lever member 34 to move the inner axle 942 of the shaft member 930 in an axial direction relative to the head member 932 in response to movement of the lever member 34 from a release position shown in FIG. 29 to the fixing position shown in FIG. 30. The bracket 948 functions (cooperates with the lever member 34) in a relatively conventional manner, and thus, will not be explained and/or illustrated in further detail herein.

Referring to FIGS. 24-30, the head member 932 is basically a cup-shaped member having an internal recess 932*a* and an abutment portion 936 with a textured abutment surface arranged and configured to contact the adapter 915. The bracket 948 of the inner axle 942 is non-rotatably received in the recess 932*a*. In other words, the recess 932*a* preferably has a shape that mates with the block-shaped support portion 948*a* of the bracket 948 to prevent relative rotation therebetween. The threaded section 32*b* of the first embodiment has been removed and replaced with the abutment portion 936 in this embodiment. In any case, the lever 34 is operatively mounted to move the head member 932 in an axial direction relative to the inner axle 942.

In this embodiment, the threaded connection 944, the set screw 946, the slots 943*a* (adjustment openings) of the engagement end of the inner axle 942 and the transverse bore 940*e* constitute parts of an adjustable fixing structure or adjustment structure disposed between the outer axle 940 and the inner axle 942 such that a final position of the lever member 34 in a rotational direction can be adjusted when a bicycle wheel is fully secured to a bicycle frame 11. Thus, the adjustment structure includes an adjustment element releasably coupled between the outer axle and the inner axle to prevent relative rotation therebetween. The adjustment element includes the set screw 946 arranged in the transverse threaded bore 940*e* of the outer axle, such that the set screw 946 is releasably engageable with the inner axle 942.

Tenth Embodiment

Referring now to FIGS. 38-44, a bicycle wheel securing structure or axle 1022 having a modified shaft member 1030 in accordance with a tenth embodiment of the present invention will now be explained. The wheel securing axle 1022 of this tenth embodiment is identical to the wheel securing axle 22 of the first embodiment, except for the shaft member 1030. Accordingly, this tenth embodiment will not be discussed and/or illustrated in detail herein, except as related to the shaft member 1030. However, it will be apparent to those skilled in the bicycle art from this disclosure that the descriptions and illustrations of the first embodiment also apply to this tenth embodiment, except as explained and/or illustrated herein. Moreover, it will be apparent to those skilled in the bicycle art from this disclosure that the wheel securing axle 1022 is designed to replace the wheel securing axle 22 of the first embodiment to mount the unit including the main hub axle 20, the hub assembly 24 and the free wheel 26 to the frame mounting flanges 14 and 16 in the manner described above with respect to the first embodiment and as illustrated in FIGS. 1-13.

In FIGS. 38-44, mounting of the wheel securing axle 1022 to mounting flanges 914 and 916 of the ninth embodiment is illustrated as another example of how the modified wheel securing axle 1022 can be utilized. A modified adapter 1017 is used in the bore of the mounting flange 916, while the adapter 915 of the ninth embodiment is used in the unthreaded bore of the mounting flange 914. The modified adapter 1017 is identical to the adapter 917, except it is axially shorter. Alternatively, a longer adapter (i.e., like the adapter 917 illustrated in the ninth embodiment) may be utilized/inserted into the bore of the mounting flange 916.

Parts of this tenth embodiment that are identical to parts of the first embodiment will be identified with same reference characters as the first embodiment for the sake of convenience. Also, parts of this tenth embodiment that are identical to parts of the ninth embodiment will be identified with same reference characters as the ninth embodiment for the sake of convenience. Parts of this tenth embodiment that are functionally identical (but not exactly identical) to parts of the first embodiment will be identified with the same reference characters but with "1000" added thereto for the sake of convenience.

The shaft member 1030 includes a modified outer axle 1040 and a modified inner axle 1042 that are attached together using a modified fixing structure to prevent axial removal of the inner axle 1042 from the outer axle 1040 and to prevent relative rotation between the inner axle 1042 and the outer axle 1040. Specifically, this embodiment uses only one set screw 46 and a threaded connection at the second end of the shaft 1030. Moreover, in this tenth embodiment, the outer axle 1040 includes an enlarged through bore 1040*d* that is threaded at the end adjacent the head member 1032. The inner axle 1042 is axially shorter than the first embodiment, and has a slightly larger diameter to mate with the enlarged bore 1040*d*. Additionally, the threads of the inner axle 1042 are located closer to the head member 1032 than a smooth engagement section or outer surface (similar to many of the preceding embodiments), which engages the set screw 46. In other words, the set screw 46 releasably frictionally contacts the smooth outer surface section at the free end of the inner axle 1042 to releasably prevent relative rotation between the inner axle 1042 and the outer axle 1040. The threads are located between the set screw 46 and the head member 1032. Thus, the set screw 46 and the transverse threaded bore of the outer axle 1040 constitutes the fixing structure of this embodiment.

In this embodiment, the inner axle 1042 is preferably constructed of an iron alloy such as chrome-moly steel, while the outer axle 1040 is preferably constructed of an aluminum alloy like the ninth embodiment. In other words, the material of the outer axle 1040 preferably has a lower specific gravity than the material of the inner axle 1042. Also, in this embodiment, the outer axle 1040 preferably has an outer maximum axial length, and the inner axle 1042 preferably has an inner maximum axial length less than one-half of the outer maximum axial length of the outer axle 1040 like the ninth embodiment. The length of inner axle 1042 received in the internal bore 1040d is preferably less than one-third of the maximum outer axial length of the outer axle 1040. The adjustment member 36 (like many of the preceding embodiments) together with the modified fixing structure of this embodiment can be considered parts of a modified adjustment structure or adjustable fixing structure. The fixing structure (e.g., the set screw 46 and the transverse threaded bore of the outer axle 1040) and the adjustment member 36 cooperate together to adjust a final position of the lever member 34 in a rotational direction with respect to the outer axle 1040.

The inner axle 1042 includes a bracket 948 like the ninth embodiment, which is received in a recess 1032a of the head member 1032 in a manner identical to the ninth embodiment. The adjustment member 36 is mounted on a threaded section 1032b in a manner similar to the first to eight embodiments. In other words, the head member 1032 is a combination of the head member 932 of the ninth embodiment and the head member 32 of the first embodiment. Specifically, the head member 1032 is mounted to the lever member 34 using the cap 935 and the bracket 948 in a manner identical to the ninth embodiment, but includes the threaded section 1032b like the threaded section 32b of the first embodiment. In view of the similarities between the head member 1032 and the head member 932 of the ninth embodiment and the head member 32 of the first embodiment, the head member 1032 will not be explained in further detail herein. The details of the adjustment member 36 can best be seen in FIGS. 3 and 11-13.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle wheel securing structure comprising:
    an outer axle having a first threaded end and a second end with an internal bore extending from the second end, the outer axle being a single continuous member with both the first and second ends configured to directly engage respective bicycle forks;
    an inner axle threadedly coupled to the outer axle within the internal bore of the outer axle in an installed position, the inner axle being a single continuous member with a first end disposed within the first threaded end of the outer axle and a second end extending out of the internal bore at the second end of the outer axle;
    a head member disposed on the second end of the inner axle;
    a lever member operatively mounted to move the head member in an axial direction relative to the inner axle in response to movement of the lever member;
    a fixing structure movably disposed between the outer axle and the inner axle between a release position and a securing position such that the fixing structure prevents axial removal of the inner axle from the internal bore of the outer axle when the inner axle is in the installed position and the fixing structure is in the securing position; and
    an adjustment member axially adjustably coupled to the head member such that the adjustment member selectively moves between a plurality of axial positions with an axially facing abutment surface moving axially with respect to the head member when the adjustment member is adjusted between the axial positions, the fixing structure and the adjustment member cooperate together to adjust a final position of the lever member in a rotational direction with respect to the outer axle.

2. The bicycle wheel securing structure according to claim 1, wherein
    the fixing structure prevents relative rotation of the inner axle within the internal bore when the inner axle is in the installed position and the fixing structure is in the securing position.

3. The bicycle wheel securing structure according to claim 1, wherein
    the fixing structure includes a set screw arranged in a transverse threaded bore of the outer axle, the transverse threaded bore extending between an external surface of the outer axle and the internal bore such that the set screw is releasably engageable with the inner axle.

4. The bicycle wheel securing structure according to claim 1, wherein
    the inner axle includes a smooth outer surface section and the set screw of the fixing structure releasably frictionally contacts the smooth outer surface section to prevent relative rotation between the outer axle and the inner axle.

5. The bicycle wheel securing structure according to claim 1, wherein
the inner axle is constructed of an iron alloy, and the outer axle is constructed of an aluminum alloy.

6. The bicycle wheel securing structure according to claim 5, wherein
the outer axle has an outer maximum axial length, and the inner axle has an inner maximum axial length less than one-half of the outer maximum axial length.

7. The bicycle wheel securing structure according to claim 1, wherein
the outer axle has an outer maximum axial length, and the inner axle has an inner maximum axial length less than one-half of the outer maximum axial length.

8. The bicycle wheel securing structure according to claim 1, wherein
the adjustment member is threadedly coupled to the head member.

9. The bicycle wheel securing structure according to claim 1, wherein
the adjustment member has a split ring configuration with a pair of free ends.

10. The bicycle wheel securing structure according to claim 9, wherein
the adjustment member includes a tightening element coupled between the free ends thereof that prevents rotation of the adjustment member relative to the head member when the tightening member is tightened.

11. The bicycle wheel securing structure according to claim 10, wherein
the adjustment member has female thread and the head member includes a male thread.

* * * * *